(12) United States Patent
Santos

(10) Patent No.: US 9,909,556 B2
(45) Date of Patent: Mar. 6, 2018

(54) SYSTEM FOR COLLECTING ENERGY FROM A MOVING MASS

(71) Applicant: Joseph Marion Santos, San Mateo, CA (US)

(72) Inventor: Joseph Marion Santos, San Mateo, CA (US)

( * ) Notice: Subject to any disclaimer, the term of this patent is extended or adjusted under 35 U.S.C. 154(b) by 0 days.

(21) Appl. No.: 15/714,572

(22) Filed: Sep. 25, 2017

(65) Prior Publication Data

US 2018/0023541 A1    Jan. 25, 2018

Related U.S. Application Data

(63) Continuation-in-part of application No. 15/497,768, filed on Apr. 26, 2017, now Pat. No. 9,803,615,
(Continued)

(51) Int. Cl.
*F03B 17/06* (2006.01)
*F03D 5/06* (2006.01)
*F01B 15/02* (2006.01)
*F03B 13/26* (2006.01)
*F03B 5/00* (2006.01)
*F03D 9/28* (2016.01)
*F03D 9/25* (2016.01)
*F03D 5/02* (2006.01)

(52) U.S. Cl.
CPC ............ *F03B 17/067* (2013.01); *F01B 15/02* (2013.01); *F03D 5/06* (2013.01); *F03B 5/00* (2013.01); *F03B 13/268* (2013.01); *F03D 5/02* (2013.01); *F03D 9/25* (2016.05); *F03D 9/28* (2016.05)

(58) Field of Classification Search
CPC ........ F03B 13/182; F03B 17/00; F03B 17/06; F03B 17/062; F03B 17/065; F03B 17/067; F03D 5/00; F03D 5/06; F01B 15/005; F01B 15/02; Y02E 10/20; Y02E 10/28; Y02E 10/32; Y02E 10/38; Y02E 10/70
See application file for complete search history.

(56) References Cited

U.S. PATENT DOCUMENTS 3,887,817 A * 6/1975 Steelman ............... F03B 13/264
 290/43
4,124,182 A * 11/1978 Loeb ......................... F03D 5/00
 244/153 R
(Continued)

*Primary Examiner* — Ryan A Reis

(57) ABSTRACT

A system comprising a tunnel implement for immersion in a moving mass. Energy from the moving mass passing through said tunnel implement is converted to rotational force. A collector device is provided having open and collapsed states, wherein the open state resists the moving mass. A rotational converting device converts the rotational force to constant singular direction. An input shaft is turned bidirectionally by the rotational force and two gears driven by the input shaft in opposite rotational directions, the gears separately attached to idler gears causing output gears attached to the idler gears to engage an output shaft in a same rotational direction. A bidirectional drive motor device drives a pulley device in a predetermined direction. A sensor device senses the position of the collector device. A trigger device is configured to activate said sensor device to indicate the collector device position and state, whether opened or collapsed.

16 Claims, 13 Drawing Sheets

Related U.S. Application Data which is a continuation-in-part of application No. 15/050,115, filed on Feb. 22, 2016, now Pat. No. 9,664,171, which is a continuation-in-part of application No. 14/816,854, filed on Aug. 3, 2015, now Pat. No. 9,664,046.

(60) Provisional application No. 62/099,133, filed on Dec. 31, 2014.

(56) References Cited

U.S. PATENT DOCUMENTS

| | | | | |
|---|---|---|---|---|
| 4,313,059 | A * | 1/1982 | Howard | F03B 17/06 290/43 |
| 8,405,244 | B2 * | 3/2013 | Zhang | F03B 17/06 290/55 |
| 2002/0033019 | A1 * | 3/2002 | Mizzi | F03B 17/00 60/398 |
| 2011/0210559 | A1 * | 9/2011 | Zanetti | F03D 5/06 290/55 |
| 2012/0104764 | A1 * | 5/2012 | Goo | F03D 5/06 290/55 |
| 2015/0176560 | A1 * | 6/2015 | Harris | F03B 13/105 290/52 |

\* cited by examiner

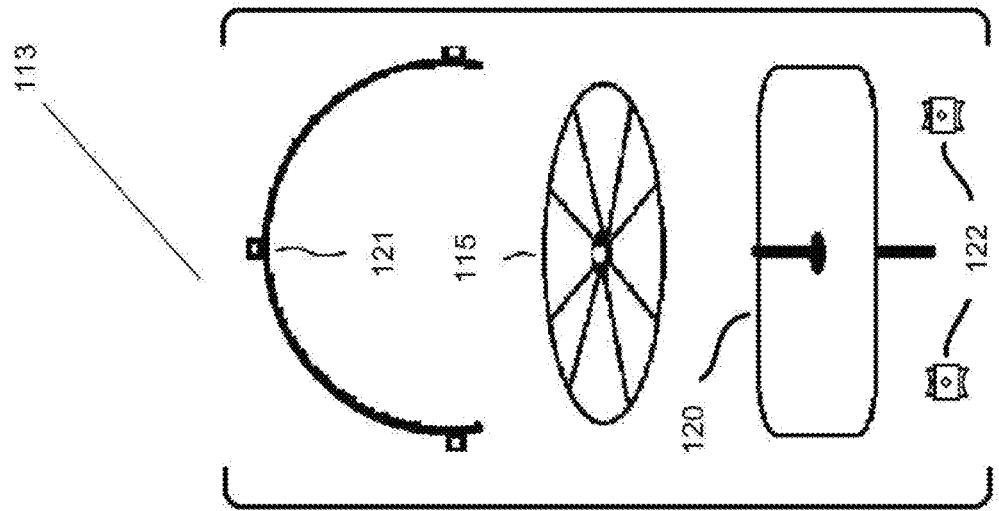
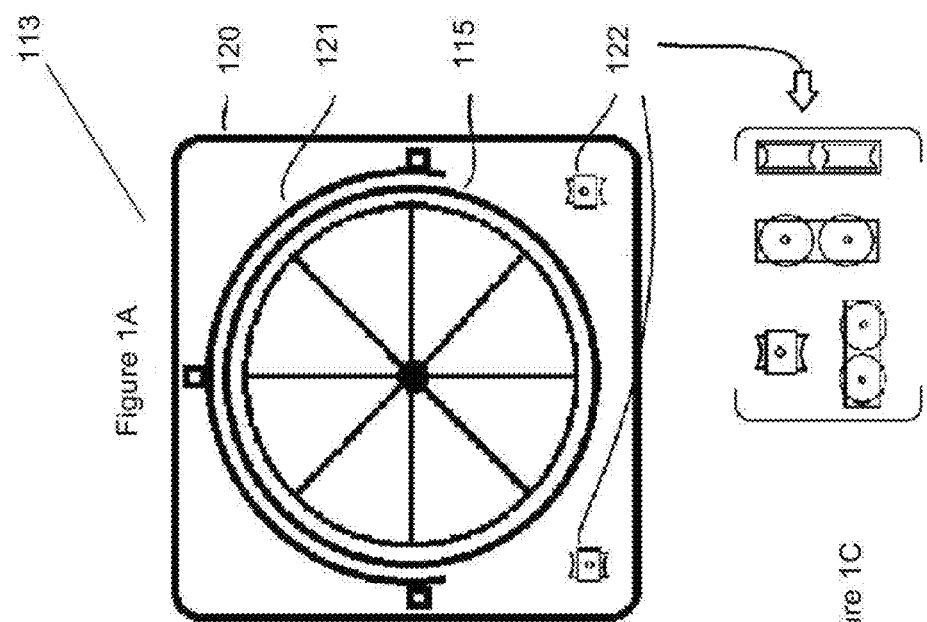

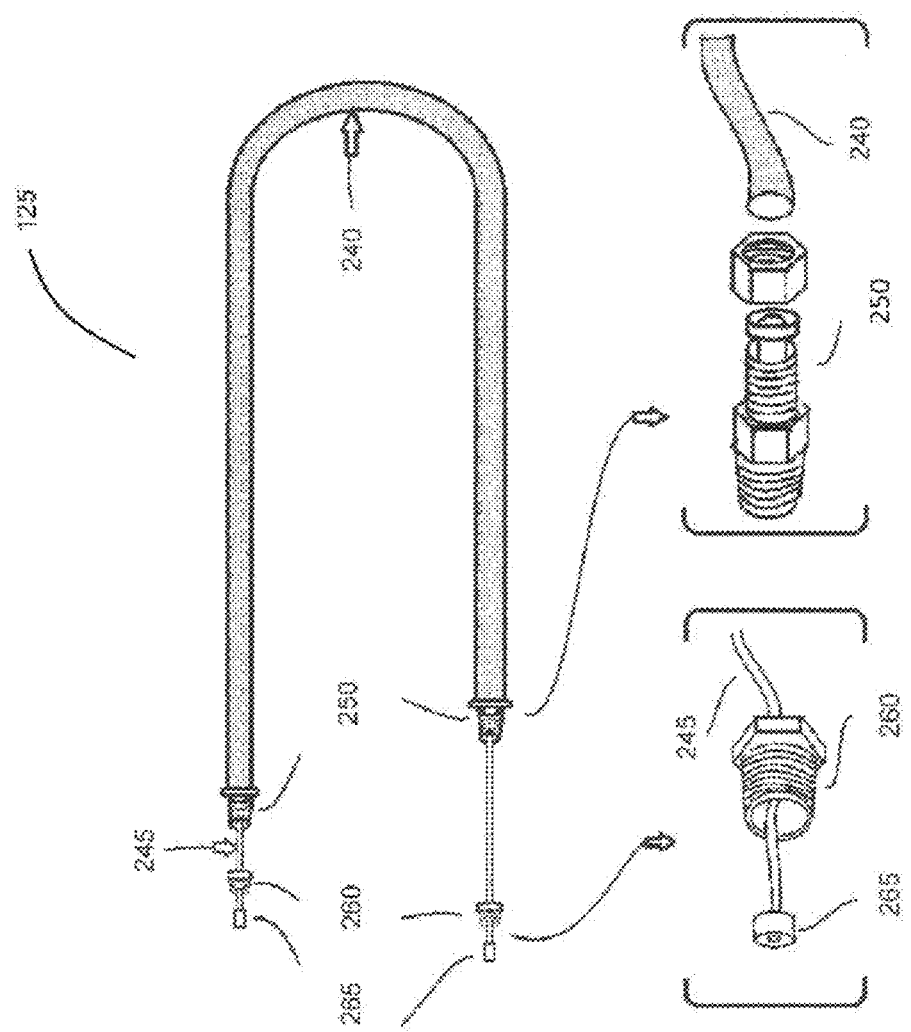

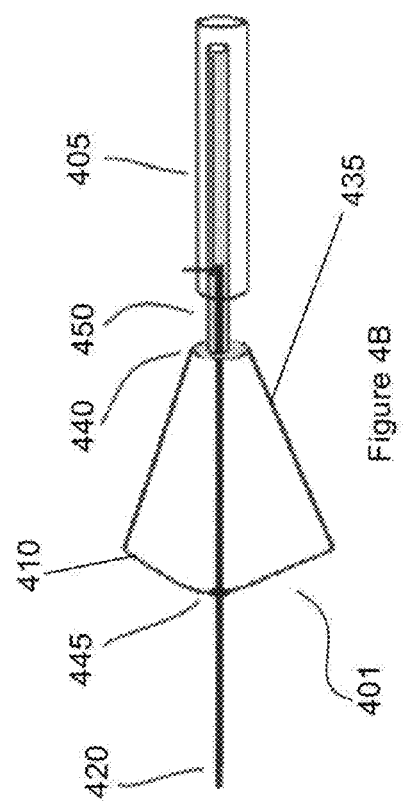
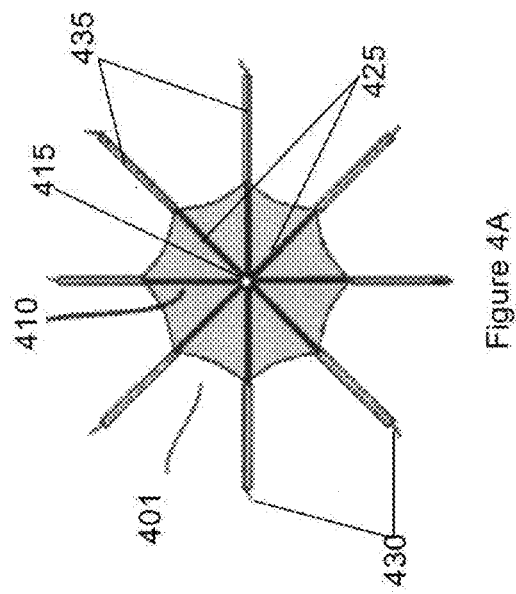
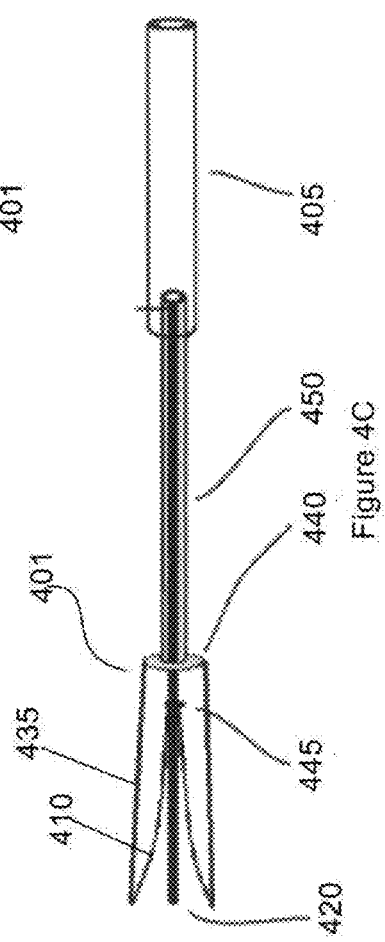

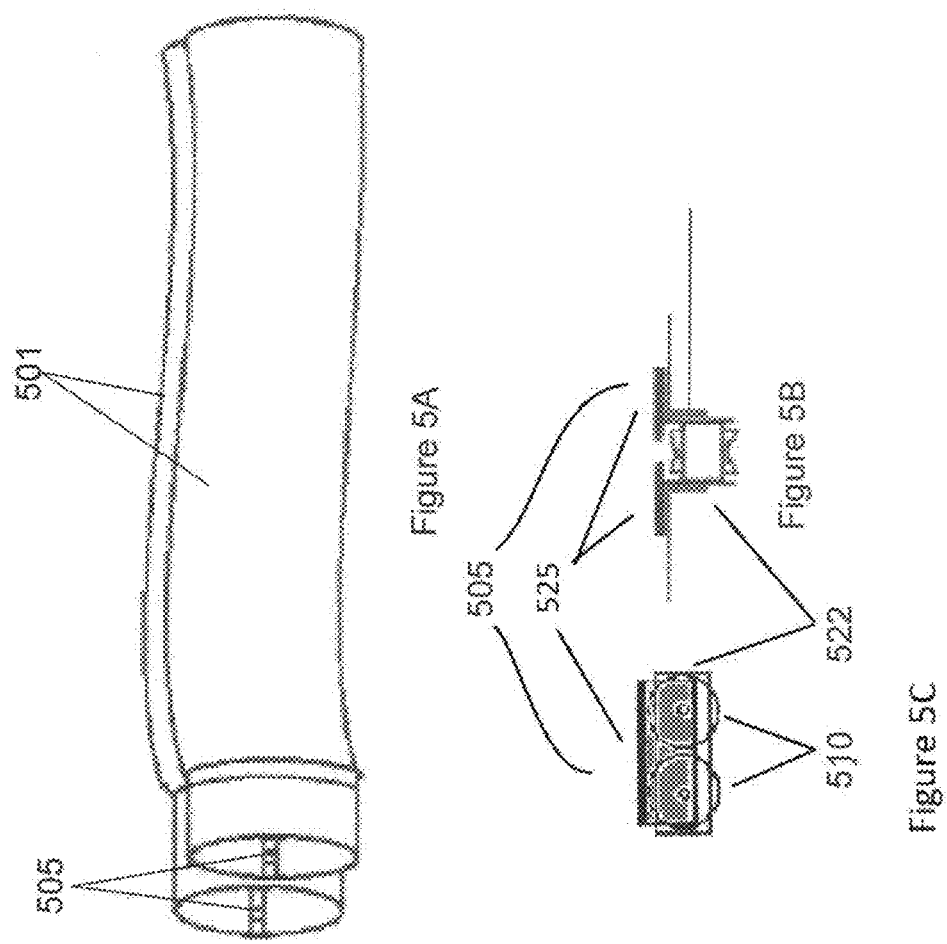

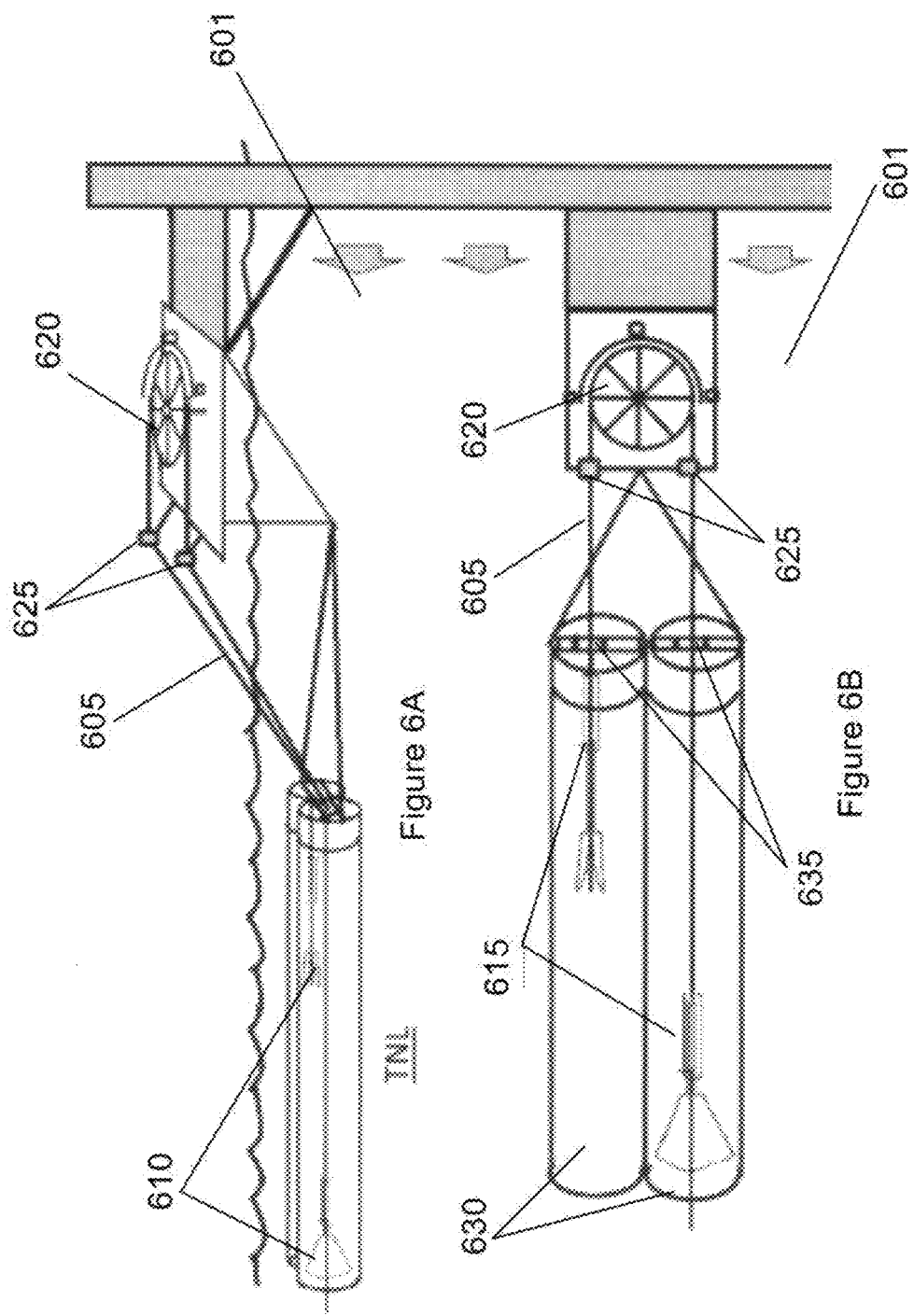

SYSTEM FOR COLLECTING ENERGY FROM A MOVING MASS

CROSS-REFERENCE TO RELATED APPLICATIONS

The present continuation-in-part patent application claims priority benefit under 35 U.S.C. 120 of U.S. nonprovisional patent application Ser. No. 15/497,768 entitled "A SYSTEM FOR COLLECTING ENERGY FROM A MOVING MASS" filed 26 Apr. 2017 and Continuation in Part application Ser. No. 15/050,115 entitled "A SYSTEM FOR COLLECTING ENERGY FROM A MOVING MASS filed 22 Feb. 2016 and U.S. nonprovisional application Ser. No. 14/816,854 entitled "A SYSTEM FOR COLLECTING ENERGY FROM A MOVING MASS" filed 3 Aug. 2015 and U.S. provisional application for patent Ser. No. 62/099,133 entitled "THE HYPER-CUTE ENERGY HARNESS SYSTEM", filed on 31 Dec. 2014 under 35 U.S.C. 119(e). The contents of these related applications are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to means for harnessing and converting energy. More particularly, the invention relates to means for harnessing energy from naturally moving masses such as, but not limited to, wind and water, and converting the harnessed energy into rotational and linear work forces. A stream-line reciprocating cylinder and piston style engine powered by the flow of natural resources.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Some believe that the world may be experiencing a global energy crisis, particularly in worldwide underserved economies where natural resources, for example, without limitation, water, and electricity may be scarce. The development of alternative sources of energy may not only help to ease this energy crisis but through the implementation of an innovative new global technology will provide enhancement to the global economic and cultural/social crises through jobs, education and resources. Furthermore, one may expect that the availability of alternative energy sources may result in a decrease in global oil dependency. Moreover, some alternative sources of energy may be environmentally friendly and may ease some of the causes and effects of global warming.

By way of educational background, an aspect of the prior art generally useful to be aware of is that there are currently some prior art approaches for harnessing energy from naturally moving masses such as, but not limited to, wind and water. These approaches are typically free flowing, undirected, open channel systems. Such approaches may not provide reliable control of the system and may not be able to handle impact from varying environmental conditions. It is believed that this may cause improper deployment, a stop in functioning, parasitic energy loss, etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B and 1C illustrate an exemplary pulley system for an energy harnessing system, in accordance with an embodiment of the present invention. FIG. 1A is a top view of the pulley system, FIG. 1B is a perspective side view of the pulley in a disassembled state and FIG. 1C illustrates exemplary cable guides;

FIG. 2A is a perspective side view of the actuator, and FIG. 2B is a perspective side view of the actuator in a disassembled state;

FIG. 2C illustrates an exemplary cable system for an energy harnessing system, in accordance with an embodiment of the present invention;

FIG. 3A is a side perspective view. FIG. 3B is a diagrammatic rear view, and FIG. 3C is a diagrammatic front view;

FIGS. 4A through 4C illustrate an exemplary energy collector, in accordance with an embodiment of the present invention. FIG. 4A is a diagrammatic front view of the collector. FIG. 4B is a diagrammatic side view of the energy collector connected to an actuator and in an open position, and FIG. 4C is a diagrammatic side view of the energy collector connected to the actuator and in a closed position;

FIGS. 5A, 5B, and 5C are perspective views of exemplary tunnels that may be used to house an energy collector for an energy harnessing system, in accordance with an embodiment of the present invention. FIG. 5A is a side perspective view of tunnels. FIG. 5B is a diagrammatic end view of an exemplary actuator activator, and FIG. 5C is a diagrammatic side view of the actuator activator;

FIGS. 6A and 6B illustrate an exemplary energy harnessing system in use in a moving mass, in accordance with an embodiment of the present invention. FIG. 6A is a side perspective view of the system, and FIG. 6B is a diagrammatic top view of the system;

FIG. 7A is a diagrammatic side view of the system, and FIG. 7B is a side perspective view of a wind collector;

Figure 1:
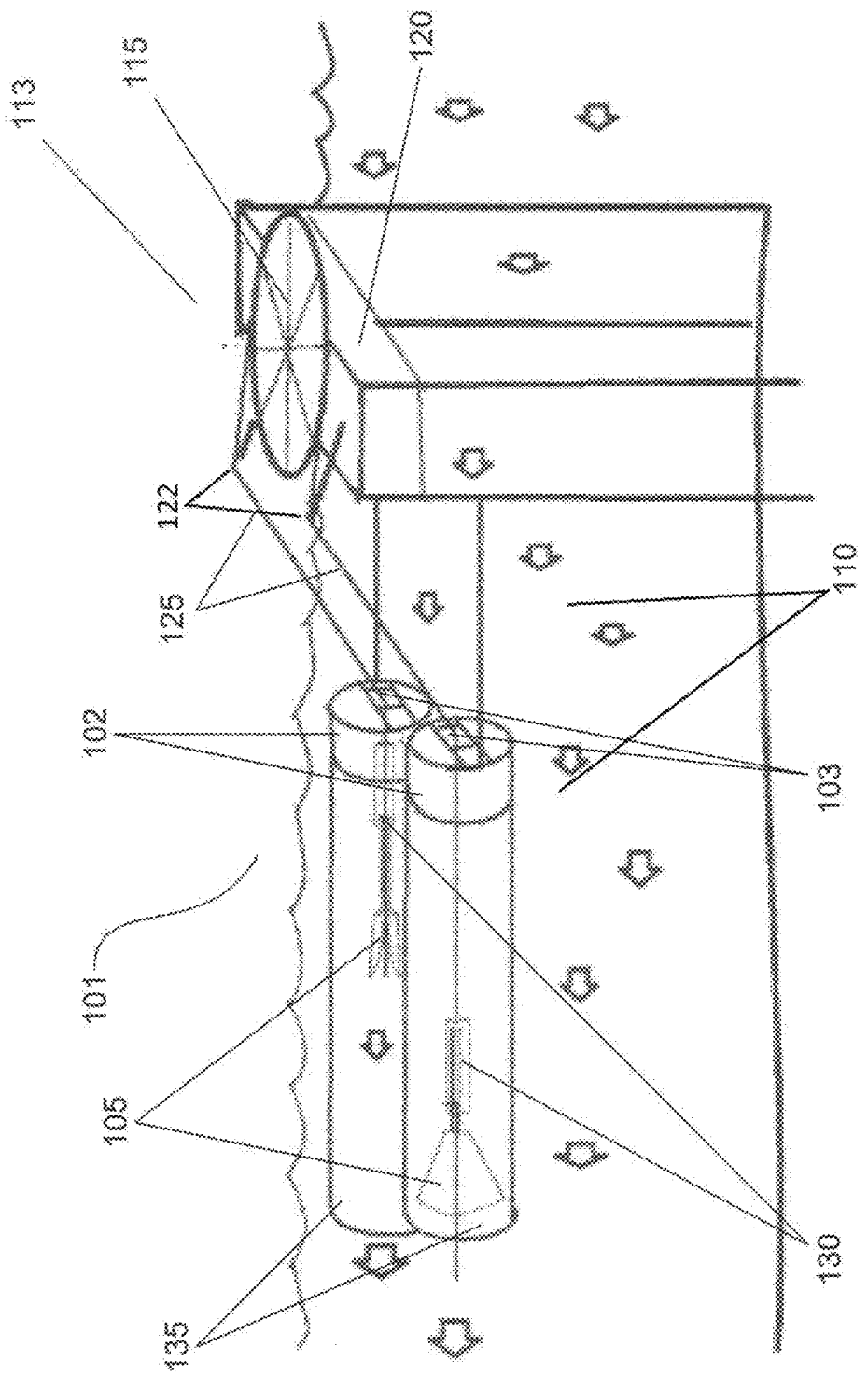
FIG. 1 is a side perspective view of an exemplary energy harnessing system, in accordance with an embodiment of the present invention.

Unless otherwise indicated, illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said, "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010). Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal manufacture of a commercial implementation of any system, and in particular, the embodiments of the present invention. A commercial implementation, in accordance with the spirit and teachings of the present invention, may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, combined or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide an efficient and eco-friendly system for harnessing energy from weight or pressure exerted on the system by naturally moving masses such as, but not limited to, wind and water. It is believed that such a system may be able to be implemented and applied to various global scenarios such as, but not limited to, fast moving masses including, without limitation, waterfalls, rivers, rapids, and gusty winds; slow moving masses including, without limitation, tidal streams, open ocean currents, slow moving rivers, and breezes; and masses moving in a predominantly horizontal direction, for example, without limitation, rivers, streams, and tides. Another aspect of some embodiments may be the ability to function as, or supply a driving force for, a large scale version of linear or tubular style electric generators or pumps for large amounts of energy production or water transportation. For example, without limitation, some embodiments may be designed as the mover system for a linear or tubular generator with the tunnels being built as tubular stators containing copper windings and the collectors and carriages may serve as movers to transport permanent magnets back and forth within the tubular stators, similar to the Faraday flashlight. Another aspect of some embodiments may be the ability to create clean, storable energy in the form of pressure in large accumulator systems or water storage systems such as dams. One type of these accumulator systems may be a large, weighted, submerged chamber, tethered or fastened to the earth, which is open to the water on the bottom and closed on the top. The chamber may have appropriate fittings to later connect plumbing to supply air from a large air compressor driven by the system as well as fittings for air delivery plumbing at the top. This chamber would fill with water through openings in the bottom. As the chamber is filled with air from the compressor, the water in this chamber would be displaced. Under the pressure from the water, this may create a large amount of air volume under pressure which may be used to drive devices when desired. For example, without limitation, some embodiments may be able to create a pressure high enough to be stored as hydraulic or pneumatic pressure, or may be able to pump water to fill a dam to be used on demand. Moreover, some embodiments may provide a device that is self-actuating with minimal hardware and positive and negative controllable motion.

FIG. 1 is a side perspective view of an exemplary energy harnessing system 101, in accordance with an embodiment of the present invention. FIGS. 1A, 1B and 1C illustrate an exemplary pulley system for an energy harnessing system, in accordance with an embodiment of the present invention. FIG. 1A is a top view of the pulley system, FIG. 1B is a perspective side view of the pulley system in a disassembled state and FIG. 1C illustrates exemplary cable guides. In the present embodiment, system 101 may be implemented as a closed channel, reciprocating, drogue and tunnel style energy harnessing system comprising of two (2) framed, flexible, drogue-like energy collectors 105 to capture energy from moving masses such as, but not limited to, wind or water. System 101 is illustrated by way of example in use in a horizontally moving mass of water 110. It is contemplated that system 101 may be able to harness the energy present in moving water 110 and convert this energy into a powerful rotational working force, which may be used to drive various devices such as, but not limited to, rotational generators, transmissions, transaxles, transfer cases, pressure and vacuum pumps, compressors, gear boxes, turbines, and external linear generators or pumps, or to drive or function as the housing and mover system for linear and tubular style generators, compressors or pumps.

It is contemplated that systems according to some embodiments of the present invention may be used to harness the energy from a multiplicity of suitable moving masses including, without limitation, water, wind, wind found in outer space, steam, gases venting from natural sources such as, but not limited to, geysers or volcanoes or manmade sources such as, but not limited to, emissions from industrial applications or exhaust systems, cooling systems in use by current power generation plants, which often pump water from natural resources like ponds, lakes, oceans, etc. Furthermore, those skilled in the art will readily recognize, in light of and in accordance with the teachings of the present invention, that some embodiments may be implemented in a vast array of applications. For example, without limitation, some embodiments may be implemented in and or on tidal dams, tidal lagoons, tidal barrages, piers, bridges, floating barges, open ocean currents and winds, oil rigs, ocean or land wind farms both floating or fastened to the earth, rivers, streams, tidal streams, high rise buildings and skyscrapers, windy plains (flat lands) and bays etc., and at any desired depth within the water column or height desired within the atmosphere. Other alternative embodiments may also be installed in high rise buildings with a rotating wind collector on the roof to direct the flowing mass to vertically installed tunnels. In a non-limiting example, the clean air exhaust from these installations may be used to ventilate a lower level parking garage or basement, etc. Furthermore, some embodiments may be implemented in multiple unit systems installed side by side or one behind the other, or both, or single unit systems. In addition, some embodiments may be implemented as portable units. For example, without limitation, a system that may be moved to different locations along a river or a system that may be pulled along behind a boat in the water or a system may be installed behind various different types of vessels which may or may not be anchored in a bay, or vehicles or structures in the air such as balloons, blimps and airships, etc. to harness wind and water power similarly to sailboats and wind surfers in windy, water based locations, i.e. bays, lakes, oceans etc. Another example of portability may be that a complete system can be carried in cruise ships to be deployed in case of emergency. Some portable systems may be implemented in remote locations, for example, without limitation, in third world areas or in the middle of the ocean deployed behind a stranded ocean liner to drive an onboard generator. Large systems can also be installed on a ship which may be driven to and anchored in a windy location or where suitable water currents can also be exploited. Another alternative embodiment may translate energy from the tunnels themselves as a linear or tubular style generator. The tunnels may be made to incorporate the stators and windings, and the carriages may incorporate permanent magnets which the collectors and carriages may transport back and forth within the tunnels to create electricity. Another alternative embodiment may require a built in load to achieve top performance. If a friction brake is used, it could generate energy from heat.

In the present embodiment, to capture the energy of a moving mass of water 110, system 101 comprises two (2) framed drogue style energy collectors 105. Collectors 105 may be connected to each other by a cable and pulley system 113. This cable and pulley system comprises a cable pulley 115, which may be mounted on a platform 120 and driven by a cable 125. The cable for these systems may or may not be of a round loosely fitted two (2) part, push-pull style cable, which has one (1) cable within the other. The outer cable for the present embodiment houses the inner cable as well as using it as the load bearing cable, as it will transfer any load from the collectors to the pulley. In the present embodiment, the inner cable will be used as a trigger cable. The inner trigger cable may transfer the triggering, or activation of the actuators, from one actuator to the other. In this particular embodiment the inner cable is typically used to pull, not push, during operation. To help prevent the inner cable from getting pushed into and jammed in the outer cable during assembly, locking collars 215 may be used to hold the inner cable in a taut position. In other embodiments the inner cable may be used to push, pull, or both. In yet other embodiments, the inner cable may or may not be present, and the outer hollow cable may be used to transfer the actuating means from one actuator to the other, electronically, hydraulically or pneumatically via electronic, hydraulic or pneumatic style actuators. These system cables may be made in many shapes, sizes, and lengths, and in various combinations of such. For example, without limitation, these cables may be round, flat, square, octagonal, hexagonal, toothed, splined, ribbed, or with spaced holes or pins. Some embodiments may comprise a separate external trigger cable instead of having the trigger cable within an outer cable. In a non-limiting example, an external trigger cable may be routed alongside the outer cable and may enter the outer cable at a desired location. These cables may be made of many materials, or a combination of materials, for example, without limitation, nylon, metals, plastics, graphene, composite materials, rubber, etc. The cables may or may not consist of low friction devices such as, but not limited to, beads, sleeves of various shapes, rollers, rings, etc., internally or externally on either cable to decrease any cable to cable friction. In additional embodiments, the outer cable may be reinforced for heavy loads with an inner low friction lining made of a material such as, but not limited to, nylon to decrease outer cable to inner cable friction. Pulley 115 may be a simple pulley that matches cable 125, and fits very closely for traction. In alternative embodiments, the pulley may contain weighted load balancers or counter balancers to assist with inertia purposes or tuning, such as, but not limited to, on the flywheel of the transmission or gearbox, to assist in smooth transitioning between collectors, particularly when used for changing a bidirectional rotation to a single direction rotation. Without limitation, these may or may not be used for varying or variable loads. Without limitation, other embodiments may implement traction aids. It is contemplated that a multiplicity of suitable pulley types and materials may be used in some alternate embodiments including, without limitation, movable pulley systems and compound pulley systems. In the present embodiment, the pulley system may be made of various materials such as, but not limited to, plastics, metals, wood, composite materials, etc. In the present embodiment, pulley 115 may act as the transfer point to typically enable the energy harnessed from moving water 110 to be converted into mechanical rotational energy to drive a pump, generator, etc. In some embodiments, the pulley may be directly connected to the driven device or may drive the device or devices via a belt, chain, gears, or through a transmission or gear box to achieve the desired results. In some embodiments, the pulley system may be built directly into the driven device. In the present embodiment, pulley 115 may be pulled in both rotational directions, one direction at a time, by reciprocating cable 125. The pulley system including, but not limited to, pulley 115, platform 120, cable guard 121 and cable guides 122 may provide for a "U" shape around pulley 115 on which cable 125 may be routed to typically enable each energy collector 105 to pull largely in the same direction.

Referring to FIGS. 1A and 1B, in some embodiments, a guard 121 may be placed around pulley 115, which may shield cable 125 and pulley 115 as well as help guide cable 125. Some embodiments may also comprise cable guards with cable to pulley anti-slip devices such as but not limited to rollers to keep the cable tight on the pulley. Some embodiments may also comprise various cable guides and brackets 122 to guide cable 125 around pulley 115 and throughout the system. It is contemplated that the design of these cable guides and brackets 122 may vary greatly depending on the application, and can be made of various different materials. For example, without limitation, cable guides and brackets 122 may be designed to incorporate cable tensioners similar to automotive style belt tensioners, if needed. In the present embodiment, most of the pulley system hardware is mounted on or near platform 120. In addition, platform 120 may be attached to a stationary object such as, but not limited to, an anchored vessel or similar structure which also holds system 101 in a stationary position within moving water 110 and may also be designed to be mountable in various applications, for example, without limitation, in rivers, tidal areas, streams, on land, in windy areas, on moving vehicles or vessels, etc.

Referring to FIG. 1, in the present embodiment, energy collectors 105 may be self-expanding and self-collapsing, which may enable energy collectors 105 to be controlled as to how and when the collectors 105 engage and disengage the moving water 110. Actuators 130 attached to energy collectors 105 may provide a means to collapse collectors 105 and may also provide a means for the expansion of collectors 105. An actuator is illustrated by way of example in FIGS. 2A and 2B. Actuators 130 typically move with collectors 105 within tunnels 135, which, with the influence of actuator activators 103 located within collars 102 in the front of tunnels 135, may enable both collectors 105 to perform opposing self-cycling actions. In typical operation of system 101, one collector 105 may be open while the other collector 105 may be collapsed, and actuators 130 may control collectors 105 so that collectors 105 open and close automatically in an alternating manner within moving water 110. Thus, collectors 105 may pull cable 125 around pulley 115 in a reciprocating fashion. For example, without limitation, cable 125 may be pulled in one direction by one collector 105 while the opposite end of cable 125 may be simultaneously retracting the other collector 105. Once cable 125 reaches the end of its allowed travel, for example, without limitation, when one of actuators 130 reaches an actuator activator 103, actuators 130 may be activated by the actuator activator 103. As the remaining tension on outer cable 125, the kinetic energy of pulley 115, and the pressure on the open collector 105 unload, while the inner cable is stopped, the actuation of both collectors 105 may complete the actuating cycle. This action may collapse the open collector 105 and open the opposing collapsed collector 105, which typically causes cable 125 to pull in the opposite direction, reversing pulley 115 and retracting the opposite collector 105. The pressure on open collector 105 is reflected on an inner tube of actuator 130 and cable 125, and is transmitted to an inner tube of the actuator 130 of the opposite collector 105, holding this collapsed collector 105 in the retrievable, inverted configuration. Continuously alternating the shape of collectors 105 ordinarily causes collectors 105 to pull cable 125 back and forth, thus rotating pulley 115 back and forth, commonly with measurable force, and without requiring an outside power source. In other embodiments, systems may or may not be hydraulically, pneumatically, electrically, electronically, magnetically, or electromagnetically controlled or assisted whether from the system itself or from an outside power source. In the present embodiment, energy collectors 105 may function within tunnels 135 with one collector 105 in each tunnel 135, which may typically enable system 101 to function as a closed channel system. Tunnels 135 may protect collectors 105 as well as guide collectors 105. Tunnels 135 may also help prevent collectors 105 from tangling with each other and from getting caught on structures or debris within moving water 110. Tunnels 135 may also control flow and maintain pressure on the collectors 105. Tunnels 135 may also house actuators 130 and actuator activators 103 inside the tunnel collars 102. Energy collectors 105 may stroke back and forth inside tunnels 135, similarly to pistons in cylinders of a two (2) stroke engine with a power stroke on every cycle. It is contemplated that in a tunnel style linear generator, every stroke of the magnets in each direction in each tunnel may be considered as a power stroke, therefore resulting in two (2) simultaneous power strokes, on every stroke, with little parasitic loss. In the present embodiment, flexible tunnels 135 may be attached to rigid collars 102 which are tethered to platform 120 or another stationary object in moving water 110 at a desired distance to typically allow submersion. These rigid collars 102 also contain the actuator activators 103 which trigger the actuators 130. Tunnels 135 may help to direct energy collectors 105 in any desired position. For example, without limitation, tunnels 135 may be mounted with means that may enable tunnels 135 and collectors 105 to rotate around platform 120 to take advantage of changes in the direction in which water 110 is moving. In other embodiments, the tunnels may be mounted in a fixed position or in an underground scenario with a rotating mass collector above ground. These rotating mass collectors may also be remotely located, and may feed the collectors via tunnels routed in any desired configuration. In the present embodiment, tunnels 135 are illustrated by way of example as cylindrical in shape. However, it is contemplated that tunnels in some embodiments may be implemented in a multiplicity of suitable shapes and sizes. For example, without limitation, some embodiments may comprise tunnels that have octagonal, hexagonal, rectangular, or triangular cross sections. Other embodiments may comprise rigid or flexible tunnels with various different shapes including, without limitation, cone-shaped tunnels, spherical or semi-spherical tunnels, decorative shapes, curved tunnels, venturi shaped tunnels, semi flexible tunnels, or semi rigid tunnels. Some embodiments may use one or more, or a combination of, accessories to manage, control, improve, capture, or direct the flow of the moving mass, including without limitation, intake or exhaust diverter doors, funneling devices, intake capturing devices, exhaust doors, buoyancy devices, debris deflectors, helical flow devices, flow restriction or control devices, break away or system unloading devices, screens, vents, etc. The tunnels may also incorporate more than one actuator activator, actuator, or collector. In another alternative embodiment, the tunnels may be mounted in a vertical position. This version may incorporate a rotating mass collector which would direct the flow into the tunnels. These rotating mass collectors may or may not be steered by the mass itself to always engage the mass. These types of tunnel systems may also be used to benefit turbine style generator systems such as but not limited to multiple inline wind or water turbine assemblies with or without a rotating mass collector, for example, without limitation, rotating mass collector 710 illustrated in FIG. 7A.

In the present embodiment, many of the elements of system 101 which are exposed to the moving mass may be made of almost neutrally buoyant and corrosion resistant materials such as, but not limited to, plastics, nylons, pvc, Dacron®, etc. Other corrosion resistant materials which may be used include, without limitation, rubber, brass, copper, epoxies, composite materials, wood, aluminum, and stainless steel. In some embodiments, some or all of the components of system 101 may or may not be, without limitation, lubricated, painted or coated with various types of materials to improve performance or prevent corrosion. In addition, the present embodiment may comprise some small foam pieces or other buoyant material which may be added where needed to aid in achieving a balanced neutral buoyancy effect throughout the actuators 130 and collectors 105. This may help prevent the returning collector 105 and actuator 130 from excessively dragging inside the tunnel 135. Those skilled in the art will readily recognize, in light of and in accordance with the teachings of the present invention, that the elements in systems according to some embodiments may be made in various different sizes and with a multiplicity of suitable materials such as, but not limited to various metals, fabrics, foams, woods, nylons, composite materials, graphene, etc. in order to apply the systems to suit various applications.

Figure 2A:
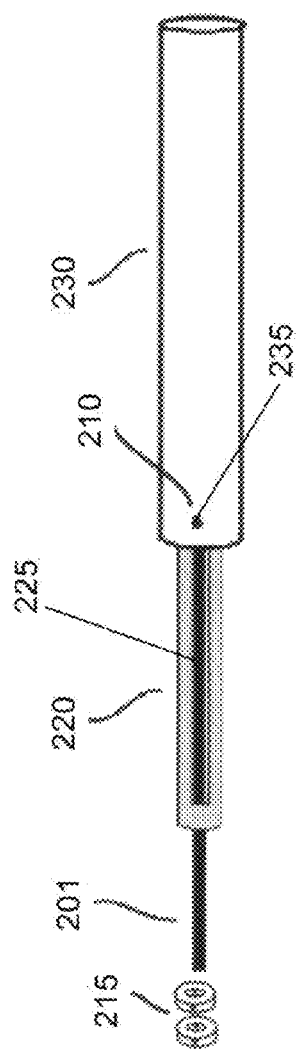
FIGS. 2A and 2B illustrate an exemplary actuator for an energy harnessing system, in accordance with an embodiment of the present invention.
Figure 2B:
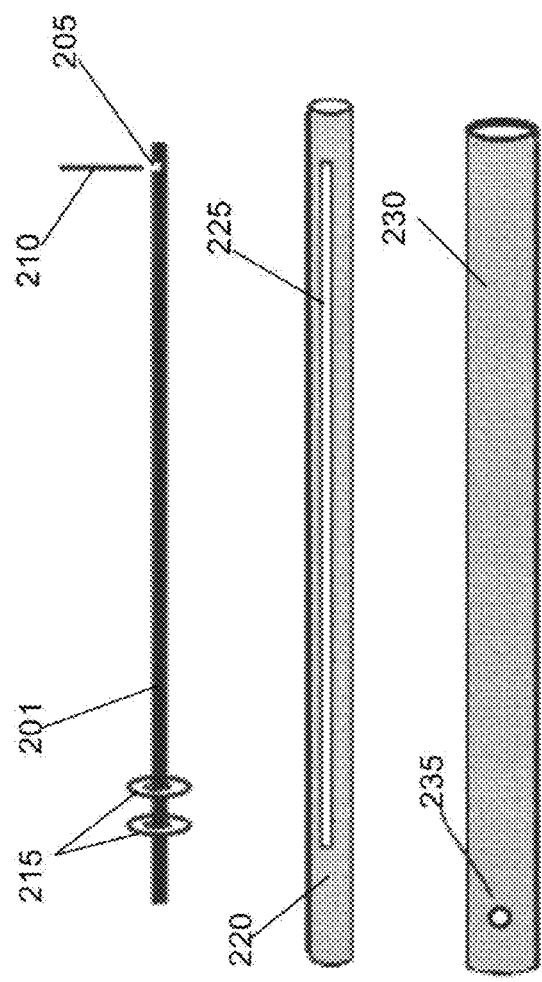

FIGS. 2A and 2B illustrate an exemplary actuator for an energy harnessing system, in accordance with an embodiment of the present invention. FIG. 2A is a perspective side view of the actuator, and FIG. 2B is a perspective side view of the actuator in a disassembled state. In the present embodiment, the actuator comprises three (3) different sized diameter tubes, which may be assembled one within the other and may slide back and forth coaxially along each other. An inner tube 201 has the smallest diameter and may be a rigid hollow tube or a solid rod. Inner tube 201 comprises a perpendicular hole 205 which may be threaded near one end into which a pin or screw 210 may be inserted or threaded. Alternatively, the pin may be made as part of the inner tube rather than being inserted into a hole in the inner tube. Furthermore, it is contemplated that some embodiments may comprise various different types and numbers of protrusions other than pins such as, but not limited to, flat plates, knobs, nails, screws, etc. This inner tube may comprise more than one (1) pin. In the present embodiment, two (2) locking collars 215 may be attached to the opposite end of inner tube 201 with set screws. Locking collars 215 may be used to adjust the coaxial position of an energy collector that may be installed on inner tube 201. Some alternate embodiments may comprise more than two (2) locking collars. Other alternate embodiments may be implemented with various different means for adjustability to attach the energy collectors to the inner tube of the actuators. For example, without limitation, in some embodiments the inner tube may be threaded along a portion of or its entire length so that an energy collector may be threaded onto the tube to a desired position and adjusted when needed by threading or unthreading the energy collector to different positions along the tube. In some such embodiments the energy collectors may be implemented without threads and instead may be held in place on the tube by a threaded fastener on each side that may be adjusted in position along the tube. Those skilled in the art will readily recognize, in light of and in accordance with the teachings of the present invention, that a multiplicity of suitable means may be used to adjustably connect the energy collectors to the actuator such as, but not limited to, split pins, cotter pins, clamps, threaded fittings, threaded tubes and spreaders, adjustable or solid linkages instead of the rigid tubes and cords, etc. It is possible that when all optimal measurements are achieved, that the adjustments may be made permanent, or the system may be made permanent without the need for adjustable apparatus.

In the present embodiment, a hollow intermediate tube 220 has the next larger diameter and comprises a slot 225 cut axially into it though not extending past either end. Referring to FIG. 2A, when assembled, slot 225 typically aligns with pin 210 of inner tube 201. A hollow outer tube 230 has the largest diameter and comprises a hole 235 at one end that may also align with pin 210. Pin 210 may fit tightly in holes 205 and 235 and loosely in slot 225, which may enable intermediate tube 220 to slide back and forth while in-between inner tube 201 and outer tube 230 while typically remaining connected. In the present embodiment, holes 205 and 235 of inner tube 201 and outer tube 230 may be positioned with respect to each other to make the longest possible configuration. The leading end of outer tube 230 may or may not be cone shaped or comprise cone shaped pieces of various materials to aid in retrieval and to absorb the impact of engaging the activator. Some alternate embodiments may be implemented in a configuration that is not the longest possible. Additional embodiments may comprise sliders, magnetic collars, and or load reliefs to provide for tuning and synchronization. For example, without limitation, in some embodiments, the hole in the outer tube may be located at other locations of the tube. Some alternate embodiments may not comprise an outer tube. In these embodiments, the pin on the inner tube may comprise a broadened end to help enable the pin to slide along the slot in the intermediate tube without disengaging from the slot. Other alternate embodiments may comprise means other than sliding tubes as the actuator, such as, but not limited to, hinged rods, accordion brackets, spring loaded actuators or spreaders, hydraulic or pneumatic sliding tube actuators, electronically, electrically, magnetically, or electromagnetically activated actuators, etc. Another alternative embodiment may be designed to use an actuator which only has two (2) tubes, an inner tube and an intermediate tube, and a regular close fitting push-pull style cable with a linearly rigid inner cable to push and pull through the outer cable. The actuator activators in this system may be in the rear of the tunnels, as opposed to the front. This system may be designed with or without the slots and pins and outer tubes. The rigid center tube may extend past the center of the collector far enough that when the center tube contacts the stop in the rear of the tunnel, the tube pushes the center of the collector into the fully collapsed position. The rigid inner cable may transmit this action to the other actuator, causing this collector to open in the front of its tunnel. The pressure on the center of the open collector may hold the inner cable in this position thus holding the returning collector in the retractable configuration. When the open collector reaches the end of its tunnel, this center tube may be first to contact the stop, pushing the center of this collector into the closed position. Thus, the linearly rigid inner cable may push the opposing actuator and collector into the open position which may restart the cycle. A collector guiding mechanism may align the inner tube with the stop to ensure engagement. The guiding systems may be achieved by the implementation of actuator carriages, by extending the inner tubes through the collectors far enough so that they always route through the activators mounted at the rear of the tunnels so that they may traverse back and forth within the activator, etc. The actuator activator for this embodiment may also be designed with a rod or tube, extending from a bracket, to fit loosely inside or around the inner tube at a distance to allow the collectors to travel back and forth without disengaging the coupling of these rods and tubes. These rods and tubes may slide back and forth one within the other as the collectors travel back and forth within the tunnels. As one bottoms out within the other towards the rear of the tunnel, the activating action will take place. For example, without limitation, the stability of this type of system may benefit a high speed, high pressure wind version, for such applications as a large, linear generator. In yet other alternative embodiments, the actuators may function hydraulically, pneumatically, electrically, electronically, magnetically, or electromagnetically with or without an inner cable. For example, without limitation, in this type of embodiment, the inner tube may incorporate a piston, the intermediate tube may incorporate a cylinder, and the outer tube may still be used to engage the actuator activator. These hydraulic/pneumatic systems may or may not incorporate valves, ports, and/or seals, or any combination of to accomplish various performance effects.

Tube lengths, diameters, and materials of the actuators may vary depending on the type and shape of the desired collectors and the amount of travel required to achieve the desired performance of the intended collector. In a non-limiting example, a collector is thirty six (36) inches in diameter with a standard drogue shaped dome. The approximate tube lengths may be inner tubes at forty-five and one half (45½) inches, intermediate tubes at thirty-five and one half (35½) inches, and outer tubes at thirty and one half (30½) inches. Tube lengths may be determined by the travel required to achieve best performance of the collectors. The amount of travel may be calculated by measuring the distance the center of the collector typically must travel from a maximum load position a position of least resistance while in a moving mass. The loaded and unloaded positions may be adjusted to achieve the desired performance and best retractable controllable shape for retrieval and may vary per application. This amount of travel may be calculated by assembling a temporary partial system with the actual collector design intended to be used. This comprises a collector, a spreader, an inner tube, an intermediate tube, and an inner and outer cable. Then one may place the collector in a test mass such as, but not limited to, a pool, lake, tide, etc. and record the relation of the inner and outer cables when the collector is in a maximum load condition. Then one would record the relation of the cables when the collector is in a condition to achieve the best retractable aerodynamic shape, which is also near a minimal resistance within the moving mass. The distance from these two measurements indicates the approximate required slot length in the intermediate tubes. In the non-limiting example, the collector is a thirty-six (36) inch standard domed shaped drogue with the slot length calculated at twenty-seven (27) inches. The spreaders are four (4) inches long, and the threaded portion for the hollow fitting is one half (½) inch. With four (4) inches for adjustment, the intermediate tube is thirty-five and one half (35½) inches long. The inner tube length starts two (2) inches deep inside the intermediate tube due to the one half (½) inch threads for the hollow fitting and one and one half (1½) inches for the inner cable swivels. From here, the inner tube extends through the opposite end of the intermediate tube. With the two tubes in this position, the pin hole in the inner tube is typically at the end of the slot closest to the cable end and determines the approximate starting point for the slot which extends from this point towards the collector end of the intermediate tube. This may be the shortest overall configuration for these two (2) tubes. The inner tube should normally be long enough to extend past the end of the intermediate tube, and through the hole in the center of a collapsed collector. In a collapsed position, the hole in the center of the collector is three (3) inches from the closest point of the spreader. The inner tube is thirty-five (35½) inches, minus two (2) inches for threads and swivels, which equals thirty three and one half (33½) inches plus the three (3) inch from intermediate tube to the center hole of collector, is thirty six and one half (36½) inches plus ten (10) inches for adjustment equaling forty six and one half (46½) inches. The outer tube should typically be long enough so that when the actuator is completely assembled, this tube may extend from a minimum of one (1) inch past the pin to a minimum of one (1) inch past the cable end of the intermediate tube hollow connector with the collector in the expanded condition. In the present embodiment, the hollow connector on the end of the outer cable typically does not protrude from within the outer tube at any time. This may help ensure that the collector has access to the full amount of desired travel. With the collector in the collapsed position, the end of the outer tube that engages the actuator activator may extend at least twenty eight (28) inches past the cable end of the hollow connector in order to be the first tube to engage the actuator activator, and allow for the intermediate tube to travel twenty seven (27) inches within the outer tube without the hollow connector striking the actuator activator. Simply put, with the test unit in the mass, one can measure the distance it takes to pull the center of the collector from the maximum load position to the best retractable position. With all of the fittings, connectors and swivels in place, the exact lengths may be determined and achieved with the adjustable apparatus. Then the cable and tubes may or may not be built to the proper measurements with or without the some or all of the adjustable apparatus. It is possible that the intermediate tubes may have more than one slot to accommodate multiple pins. In another alternative embodiment, the collector ribs may be rigid, and the rigid tubes may be flexible, or both may be rigid or flexible, as long as they can be configured to work together to achieve the open and closing effect.

In yet other alternate embodiments, the energy collectors may be attached to the actuator in a non-movable manner. Once the desired performance is achieved, the systems may be built without the need for adjustable apparatus. It is contemplated that in some scenarios, the collectors may be permanently attached to the actuators. In another alternative embodiment, an external trigger cable may be used and attached to the center of the collector. This trigger cable may or may not enter into the outer cable at each end as desired. This trigger cable may implement an actuator activator located outside the moving mass, if desired, to activate the actuators. In another alternative embodiment a system may implement multiple actuator activators for added control or performance. Depending on the system application, various designs of actuator activators may be required, and may be made of various components and materials including, but not limited to, wood, plastic, metals, cement, brackets, levers, tubes rods, ropes, cables, linkages, hinges, inflatable membranes, etc.

FIG. 2C illustrates an exemplary cable system for an energy harnessing system, in accordance with an embodiment of the present invention. In the present embodiment, the actuator 130 may be connected to a cable 125 that engages a pulley 115, as illustrated by way of example, in FIG. 1. This cable 125 may be a loosely fitted, push/pull style cable comprising two (2) actual cables, an inner cable 245 within an outer hollow cable 240. The inner cable 245 may be longer than the outer cable 240 so that the inner cable 240 may protrude from both ends of the outer cable 240. Both inner cable 245 and outer hollow cable 240 may comprise threaded connectors 260 and 250 at each end that may screw into or onto inner tube 201 and intermediate tube 220 of the actuator. The ends of inner tube 201 near hole 205 may be attached to threaded swivel connectors 260 on the inner cable 245 to help prevent cable binding. It is contemplated that the inner tubes of the actuators in some alternate embodiments may be attached to the cable using various different means including, without limitation, ball bearing swivel connectors, non-swiveling connections, sliders, set screws, threads, adhesives, clips, pins, quick release fittings similar to air hose connectors, etc. In the hydraulic or pneumatic version, the cable end of the inner tube may be fitted with an even smaller diameter hollow tube which would protrude from the inner tube threaded fitting, through the outer hollow cable fitting, and deep enough into the outer cable to allow it to travel back and forth within the outer cable without exiting the outer cable hollow fitting. This smallest diameter tube may be used as a sealing surface for a seal or O-ring located inside of the hollow hose type outer cable connector to provide for a sealed system which may be required for a pressure style, sealed, hydraulic or pneumatic system. In the present embodiment, the outer hollow cable 240 may comprise hollow, threaded, hose type connectors 250 at each end that may be attached to the end of intermediate tubes 220. This is the shortest, solid end of intermediate tube 220. The longer solid end may be attached to the spreaders and collectors. In some embodiments, connectors 250 may be fitted with an internal O-ring or seal for the hydraulic or pneumatic style actuators. In some embodiments, a breakaway coupler may be installed on the outer cable or any of the tubes. This coupler may be used to unload the pressure in the system by allowing both collectors to collapse into the retractable position simultaneously. This can be used as a safety device against unwanted pressure in an emergency situation, or to allow servicing. In the present embodiment, one actuator is typically attached to each end of the cable 125. When making the cable 125, the desired amount of travel between cables 240 and 245 is first determined according to the design of the collectors to be used. Then, with both hollow connectors 250 installed onto the outer cable 240, the inner cable 245 is inserted into the outer cable 240, the swivel connectors 260 are installed onto each end of the inner cable 245 and cable crimps 265 may be crimped on. When the correct measurements are achieved, the inner cable 245 may or may not bottom out within the outer cable 240 when one collector is in the desired retrievable configuration. This may or may not relieve any unnecessary pressure on the pin and slot for these types of embodiments. The crimps 265 finalize the length of the inner cable 245, as well as complete the swivel assembly. Swivel and crimp design may vary depending on the application, and can be made of many materials including, without limitation, wood, metals, carbon fiber, fiberglass, plastics, composite materials, etc. Some alternate embodiments may comprise two (2) separate cables rather than a cable inside a cable.

An actuator according to the present embodiment may be used as part of a self-activating, dual actuator system that uses two or more energy collectors on a push/pull style cable 125, which may be controlled by the actuators and triggered by a mechanical stop referred to as the actuator activators similar to actuator activators 505 illustrated by way of example in FIGS. 5A through 6B. The actuators may also act as the expanding and collapsing device for the energy collectors. In normal operation, the inner cable 245 of the push/pull cable 125 may be used as a transmitting device to transmit the activation of the outer and inner tube of the actuator of the opening collector to the open and pulling collector's actuator causing the actuator to collapse the open collector by stopping the travel of the open and pulling collector by the center. This accomplishment starts the reciprocating cycle of the actuators and collectors, and as the now open collector gets pulled by the flowing mass, the cable and pulley typically reverses direction until the cycle repeats itself. The outer hollow cable 240 may drive the pulley, and transmit the completion of travel of the intermediate tube of the closing collector's actuator to the intermediate tube of the opening collector's actuator under pressure of the moving mass until the travel of the tubes is completed. The hollow, threaded connectors 250 at each end of the outer cable 240 may enable the inner cable 245 to move back and forth freely within the outer cable 240. Although the inner cable 245 can move back and forth within the outer cable 240, the swivel connectors 260 on the inner cable 245 typically cannot pass through the hollow connectors 250 of the outer cable 240. This interference fit may be used as the load bearing point for the pressure exerted on the inner cable 245 from the bottom of the open collector while under load. Referring again to FIG. 2A, since outer tube 230 and inner tube 201 are connected by pin 210, the movement of outer tube 230 typically causes inner tube 201 to move correspondingly, while also moving the inner cable 245 within the outer hollow cable 240. In addition, as the inner cable 245 moves back and forth within the outer cable 240, the distance between the end of inner tube 201 and the end of intermediate tube 220 varies. These distances are controlled by the movement of outer tube 230. The ends of inner tube 201 and the ends of outer tube 230 stay the same as the two (2) tubes are connected via the pin 210. Only the intermediate tube 220 slides back and forth while in between the inner and outer tubes, 201 and 230 respectively. As the actuators travel with the collectors, the cable assembly, which is routed through the cable guides and actuator activators 103, as illustrated by way of example in FIG. 1, is pulled. The outer tube 230 on the retrieving collector will be first to contact the actuator activator located in the front or intake end of its tunnel. Via the pin 210, the actuator activator may also stop the travel of the inner tube 201. As the intermediate tube 220 and outer load bearing cable 240 continue to travel under load of the mass, the lever action of the collector framing may cause this collector to expand in the front of the tunnel. As the inner tube 201 has been stopped, the opposing actuator may begin to collapse this collector in the rear or exhaust end of its opposing tunnel. To transfer this effect to an energy collector, the end of intermediate tube 220 not attached to the outer cable may be fitted with a spreader, as illustrated by way of example in FIGS. 3A through 3C, which may attach to cords on the energy collector, and the end of inner tube 201 not attached to the inner cable may be attached to the center of the energy collector. It is contemplated that actuator design and function may be similar for both systems and configured to capture energy from moving masses of liquid and moving masses of air or gas. Furthermore, actuators may be sized per application and dimension of the energy collectors.

Figure 3A:
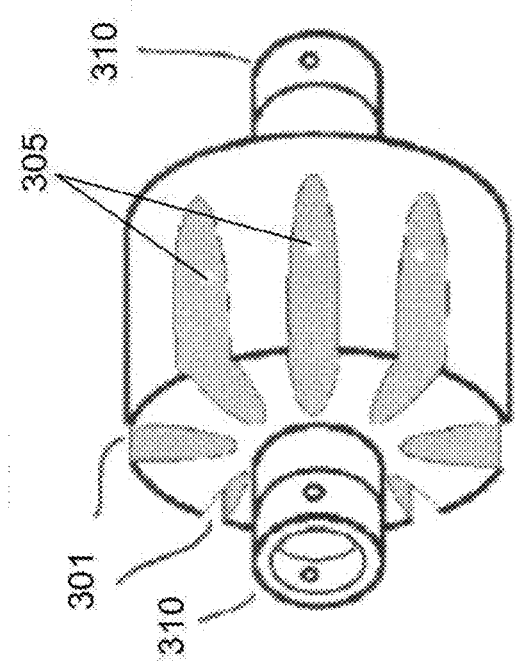
FIGS. 3A through 3C illustrate an exemplary spreader for use with an actuator for an energy collector, in accordance with an embodiment of the present invention.
Figure 3C:
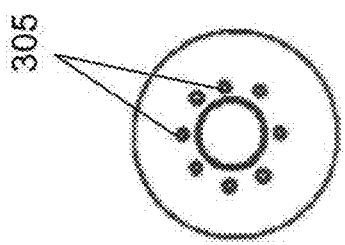
Figure 3B:
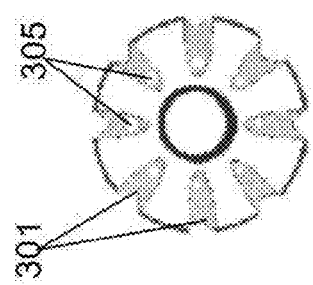

FIGS. 3A through 3C illustrate an exemplary spreader for use with an actuator for an energy collector, in accordance with an embodiment of the present invention. FIG. 3A is a side perspective view. FIG. 3B is a diagrammatic front view, and FIG. 3C is a diagrammatic rear view. In the present embodiment, the spreader comprises eight (8) grooves 301, and each groove 301 comprises a hole 305. The number of grooves may be dependent on the number of cords or linkages from the collectors. The spreader may also be accompanied by two (2) locking collars 310 that may enable the spreader to be secured on a tube of an actuator, illustrated by way of example in FIGS. 2A and 2B. Collars 310 may be held in place on the tube by set screws, split pins, cotter pins, clamps, clips, brackets, etc. Alternately the collars may be permanently attached to the tube, for example, without limitation, with adhesives or welding. In the present embodiment the spreader is typically fit onto an intermediate tube of an actuator loosely enough to enable the spreader to rotate on the tube. The spreader may be adjusted in position axially along the intermediate tube using locking collars 310. In other embodiments, the spreaders may or may not fit the intermediate tubes loosely enough to allow the spreader and collector to rotate on the tube. In typical use of the present embodiment, grooves 301 may hold tubes extending from an energy collector, and holes 305 may be configured to hold cords 430 extending from the energy collector, illustrated by way of example, in FIGS. 4A and 4B. The spreader may act as a means to attach the cords 430 and rigid tubes 435 of the energy collector 401 to the tube of the actuator, while typically allowing the energy collector to expand and collapse. The cords 430 may be pulled through holes 305 until the rigid tubes 435 are seated in the grooves 301 of the spreaders and then tied off for securing.

FIGS. 4A through 4C illustrate an exemplary energy collector 401, in accordance with an embodiment of the present invention. FIG. 4A is a diagrammatic front view of collector 401. FIG. 4B is a diagrammatic side view of energy collector 401 connected to an actuator 405 and in an open position, and FIG. 4C is a diagrammatic side view of energy collector 401 connected to actuator 405 and in a closed position. In the present embodiment, collector 401 comprises framed, flexible membranes 410 that can be made in various materials, sizes and shapes per application. For this exemplary water application, collector 401 may act as a piston in an energy harnessing system. Collector 401 may be built so that membrane 410 can be mechanically expanded and contracted in a controlled manner. Collector 401 comprises a hole 415 in the center to accommodate an inner tube 420 of actuator 405. Hole 415 may fit loosely enough onto inner tube 420 to typically enable collector 401 to rotate on tube 420. In some embodiments this hole 415 may be reinforced, for example, without limitation, with extra stitching or a grommet, to help prevent tearing of membrane 410. In the present embodiment, the axial placement of collector 401 may be adjusted by locking collars on inner tube 420, one on each side of the collector 401, previously described by way of example in accordance with FIGS. 2A and 2B. The point at which collector 401 is located on inner tube 420 will herein be referred to as a travel point 445, and this travel point 445 typically varies throughout the reciprocating cycle of collector 401.

Referring to FIG. 4A, in the present embodiment, collector 401 comprises eight (8) semi-flexible ribs 425 and eight cords 430. Ribs 425 may be sewn into collector 401 from the center of collector 401 near hole 415 outward to the points where cords 430 attach to collector 401. In some alternate embodiments the ribs may be attached to the membrane with adhesive rather than being sewn into the membrane. In addition, the ribs may vary in flexibility depending on the application and in some embodiments may be completely rigid. In the present embodiment, collector 401 also comprises eight (8) small diameter, rigid tubes 435 through which cords 430 may be routed, thus making these sections of cords 430 mostly rigid. The loose ends of cords 430 may be pulled through holes in a spreader 440, similar to the spreader illustrated by way of example in FIGS. 3A through 3C, and tied off. The grooves in spreader 440 may enable rigid tubes 435 to expand and contract, while the holes may act as anchor points for cords 430 and rigid tubes 435. It is possible to design similar devices to accomplish the spreading action. These can be designed to use a standard type linkage which may or may not be adjustable and made of many materials including, but not limited to, metals, plastics, fiberglass, carbon fiber, wood, etc. It is contemplated that rigid tubes 435 may be completely rigid or may have some flexibility. The relationship between the rigid tubes 435 and flexible ribs 425 is to accomplish the uniform expansion and uniform collapsing of the collector 401. Tubes 435 and ribs 425 hold the collector 401 in optimal configurations for the open and closed configurations of the collector 401, and may be in any configuration to do so. For example, without limitation, in some configurations every other rib may be flexible and every other tube may be rigid. Other configurations may comprise various different combinations of flexible and rigid tubes and ribs. Furthermore, those skilled in the art will readily recognize, in light of and in accordance with the teachings of the present invention, that energy collectors in some alternate embodiments may be implemented in a multiplicity of suitable shapes and sizes and with differing numbers of ribs and cords in a wide variety of configurations. For example, without limitation, some embodiments may comprise square collectors that comprise four (4) ribs and four (4) cords, each beginning at a center hole of the collector and extending out to the corners of the collector. Other embodiments may be configured with a framed membrane without flexible ribs. In some embodiments, these collectors may be of many shapes and sizes, and be made of various materials and designs including the framing. For example without limitation, collectors can be round, square, triangular, rectangular, octagonal, hexagonal, etc. In some embodiments the collectors may comprise rigid plates hinged together. For example without limitation, certain flexible materials may be used and designed with ribs molded into it, or with different rates of thickness or flexibility to create a retracting effect similar to that of tube worms found on sea floors and ocean bottoms. The collecting membrane of the collectors can also be made of many different materials, or combination of materials, such as nylons, fabrics, plastics, graphene, metals, etc., which may or may not be made of mesh materials, or incorporate perforations, pockets, slits, tails, fins, etc., to improve performance. In other scenarios, the collectors may collapse into a tubular flange on the collector end of the intermediate tube or on the outer tube to aid in retrieval. The collectors may be designed in any shape capable of being folded, or collapsed into a controllable configuration. In typical operation of the present embodiment, the motion of ribs 425 and tubes 435, typically initiated by actuator 405, may create a mechanical lever action within membrane 401. Each rib 425 and tube 435 of collector 401 may act as a leg of a triangle of which all share a common third leg along inner tube 420 of actuator 405, which may vary in length. Each rigid tube 435 may form one leg of a triangle from spreader 440 to ribs 425, and each rib 425 may form another leg of the triangle from the rigid tube 435 to hole 415 in the center of collector 401. The third leg of the triangle is formed by inner tube 420 from hole 415 to the ends of rigid tubes 435. A travel point 445 may be located at the point where inner tube 420 passes through hole 415. As inner tube 420 moves back and forth within intermediate tube 450 of actuator 405, the third variable leg, the distance from spreader 440 to travel point 445, changes. This changes all the angles within all the triangles built into collector 401 simultaneously, causing the expanding and collapsing affect. Referring to FIG. 4B, when inner tube 420 is extended from intermediate tube 450, this distance from travel point 445 to spreader 440 may be lengthened, and this collector will expand. Referring to FIG. 4C, when inner tube 420 is pulled into intermediate tube 450, this distance from travel point 445 to spreader 440 may be shortened and collector 401 typically collapses into an inverted aerodynamic configuration for ease of retrieval.

FIGS. 5A, 5B, and 5C are perspective views of exemplary tunnels 501 that may be used to house an energy collector, actuator, and actuator activator for an energy harnessing system, in accordance with an embodiment of the present invention. FIG. 5A is a side perspective view of tunnels 501. FIG. 5B is a diagrammatic end view of an exemplary actuator activator 505, and FIG. 5C is a diagrammatic side view of actuator activator 505. Referring to FIG. 5A, in the present embodiment, tunnels 501 may be cylindrically shaped, flexible and semi-buoyant. The design of the present embodiment implements flexible tunnels, which may require a means to secure the tunnels 501, as well as the actuator activators 505. In some embodiments, these flexible tunnels may be of a fabric style material with supports to keep the tunnels open or may be collapsible. For this, these tunnels may incorporate a rigid collar in the forward end to receive the oncoming mass, and to allow for fastening the tunnels to a stationary structure in relation to the moving mass. These collars also make other accessories possible, such as, but not limited to, funneling devices, diverter doors, debris deflectors, etc. In typical use, tunnels 501 each house one energy collector, one actuator and one actuator activator 505 to control the actuator for the collector. Tunnels 501 create a closed channel system that may help protect the energy collectors and actuators from the environment and may help prevent the energy collectors from becoming tangled with each other. Tunnels 501 may also provide a nozzle effect that may increase the speed of the moving mass, which may produce more energy. Additionally, tunnels 501 may enable a user to direct the energy collectors in a particular direction. It is contemplated that tunnels 501 may be made from a multiplicity of suitable materials including, without limitation, various different plastics, cement, concrete, wood, carbon fiber, graphene, fiberglass, metals, composite materials, fabrics, or a combination of the fore mentioned. Moreover, tunnels in some embodiments may be made in a variety of different shapes and may be flexible, semi-flexible or rigid. In another embodiment, tunnels may also incorporate internal rails, guides, or slides to assist and guide a collector carriage which would support and guide the collectors as they traverse within the tunnels. In the present embodiment, tunnels 501 may be attached to a stationary object in a moving mass or towed behind a moving vehicle or vessel to acquire data at various speeds.

Referring to FIGS. 5B and 5C actuator activators 505 may comprise two (2) opposing freewheeling pulleys 510 which may be assembled to fit the system cable and guide the cable through a pulley bracket 522 and plates 525 with minimal resistance. On the collector side of the actuator activators is a plate or plates 525 configured to let the cable pass through with ease, but not let the actuator assembly pass through. The plate 525 on the collector side may engage the outer tube of the oncoming actuator, to activate the actuator and expand this collector. This may cause the cable and pulley to reverse direction until the opposite actuator gets pulled to engage the activator in the opposite tunnel. Other possible activator designs may comprise a multiplicity of suitable elements such as, but not limited to, brackets, tubes, rods, plates, bars, pins, magnets, membranes, springs, rubber stops, etc. The actuator activators 505 may be located in various locations, for example without limitation, in the front or rear of the tunnels 501, or both, and anywhere in between, as well as outside of the tunnels 501 either fixed to the earth, or attached to any structure stationary in reference to the moving mass.

FIGS. 6A and 6B illustrate an exemplary energy harnessing system in use in a moving mass 601, in accordance with an embodiment of the present invention. FIG. 6A is a side perspective view of the system, and FIG. 6B is a diagrammatic top view of the system. In the present embodiment, the system is designed with a two (2) part push/pull cable 605 comprising an inner cable and an outer cable. The inner cable may be made longer than the outer cable by a predetermined length acquired by determining the difference in length between the positions of energy collectors 610 when at maximum pull and the positions of energy collectors 610 at least resistance and best aerodynamic shape when collapsed. This difference in length may be found by hand using a physical test assembly or computer simulations. If the optimal dimensions of the collector 610, both expanded and contracted, are previously known, one can simply use this dimension to calculate the required amount of travel. Due to the fact that fluid and air pressures are equal in all directions, the pressure on the expanded collector 610 is reflected on the center cable and will hold the inner cable in this position until the pressure is relieved. This pressure on the inner cable may be more than the pins can hold under load for long term, therefore, the cable lengths may be calculated so that the swivels on the inner cable will bottom out against the threaded hollow hose type fitting on the intermediate tubes to absorb this pressure as opposed to the pins. A dampening device may be used here to cushion any impacts that may develop, for example but not limited to rubber spacers, springs, etc. This fit may be able to absorb the pressure while under load as opposed to this load getting applied to the pin. This fit may also be adjustable by the collars on the inner and intermediate tubes. Because the inner cable is somewhat longer than the outer cable, in order to prevent the inner cable from getting pushed into, or bunched up within the intermediate tube, the end sections of the inner cable can be made rigid, and or protected by a rigid thin walled shielding tube which may connect to the cable end of the swivel, and extend through the hollow fitting in the intermediate tubes. Once the optimal results are acquired, the adjustable apparatus may or may not be removed, and each tube may or may not be made as a one piece molded tube. This travel distance may also be optimized via adjustable collars on each actuator 615 that regulate the placement of a travel point of collector 610 on an inner tube, and the placement of a spreader on an intermediate tube. This difference in length typically ensures that during operation only, one collector 610 can be expanded at a time while the other collector 610 is collapsed or collapsing.

In the present embodiment, the system is installed in such a way that a pulley system 620 and cable guides 625 may be in a stationary location, for example, without limitation, on an anchored vessel in a water current, river or stream or mounted on structures such as, but not limited to, bridges, a pier, pilings, or driven vessels, while tunnels 630, actuator activators 635, actuators 615, and collectors 610 may be located in the moving mass 601. This may enable the system to harness the energy from moving mass 601 while devices to be driven by the harnessed energy can be located away from moving mass 601. In some embodiments, the pulley system may be placed directly in the moving mass. Additionally, the driven devices may also be placed in the moving mass in some applications. For example, without limitation, in one embodiment, the system may be implemented to drive a pump, used to pump water from within the same stream from which energy is being harnessed, over long distances possibly for agricultural or energy collection and storage purposes, in a non-limiting example, to pump water into a dam or water shed. In a non-limiting example, the wind version may not require much modification, but in liquid mass, waterproof components may be desired for lasting performance. In other alternative embodiments, the wind version may drive a water pump, and the water version may drive an air pump or air compressor.

In typical use of the present embodiment, as moving mass 601 travels down tunnels 630, mass 601 fills one of collectors 610 and causes the collector 610 to expand. This may cause the collector 610 along with the connected actuator 615 to travel through the tunnel 630 away from stationary pulley system 620 and the opposing collector 610 in the opposing tunnel 630 to be pulled towards the stationary pulley 620 until this actuator 615 reaches the actuator activator 635 located in the front of this tunnel 630. As the actuators 615 travel with the collectors 610, the outer tube on the retrieving actuator 615 is typically first to contact the actuator activator 635. Via the pin, through the slot, this outer tube stops the travel of the inner tube. Via the inner cable, this typically stops the opposing inner tube on the opposing actuator 615. As both intermediate tubes and the outer, load bearing cable continue to travel under load of the mass 601, both actuators 615 activate once the retrieving actuator 615 engages activator 635. This normally causes the retrieved collector 610 to expand. As the inner cable has been stopped on the opposing end, this actuator 615 begins to collapse this open collector 610. At this moment, the travel point and spreader of the other collector 610 may begin to move apart and the reversal of the collapsing action is initiated. Through the built in lever action, this collector 610 mechanically expands. This typically creates small pockets in the bottom of collector 610 that begin to fill with pressure from moving mass 601. With the cords of the collector 610 being held by the spreader, the collector fills until fully expanded, restarting the process and reversing the pull on cable 605 until the travel of actuators 615 is complete. The reciprocating movement of cable 605 may then be translated into a rotational force by pulley system 620.

It is contemplated that the pressure created as the collector opens and the tunnel fills with the moving mass, may be used in various ways. For example, without limitation, this pressure may be used as a timed control pressure for hydraulic cylinders or to inflate flexible membranes which can be used for a variety of uses, to control or operate different accessories such as, but not limited to, flexible membranes in various shapes to fill or control the movement of diverter doors, hydraulic or pneumatic dampeners, cylinders, pouches to control, restrict or enhance flow, to provide detectable pressures for electrical pressure switches or sensors, etc. In another alternative embodiment, the tunnels can be modified to accommodate turbine style devices in certain situations to increase turbine performance possibly by means of multiple inline turbine units in a long venturi shaped tunnel.

Some embodiments may comprise a gear box or transmission which may convert a bidirectional rotating force from the pulley into a unidirectional motion using sprag clutches, one way bearings, etc. Another embodiment may comprise a rotational hydraulic pump. It is possible to configure a hydraulic system to create pressure in both rotational directions of the pump with several properly located hydraulic check valves. This may provide hydraulic pressure from each stroke of each collector. Some embodiments may be used as a pump to create hydraulic pressure, transfer fluids, as a generator to create electricity or may be incorporated into such items. Some embodiments may be configured for use as a portable work producing unit, for example, without limitation, as a pre-assembled unit/system for use in a remote location or emergency situation such as, but not limited to, as an emergency electricity source on a boat, as a pump in a flooded area that may be experiencing electrical outages, as a generator or water supply for a campground or village situated near a river or stream, etc.

It is contemplated that some embodiments may be able to create a pressure within the tunnels themselves. In another alternative embodiment, when the collector opens in the tunnel, the flowing mass accumulates in the tunnel creating pressure within the tunnel which can be tapped into as a control pressure. This may create an alternating pressure only present on the power stroke which can be used as a timed pressure. Other alternative mass engaging devices may also be made from an external flow engaging device such as, but not limited to, a secondary external collector, a drogue chute, or a funnel to create low pressure signal or control pressures. In some applications, pockets may be placed on the outside of the tunnel with a hollow nipple in the aft end to provide a more constant control pressure during flow. These means for capturing pressure may be used to pressurize hydraulic or pneumatic cylinders, to fill flexible membranes in various shapes to create various effects similar to an air pressurized jumper for children, for guiding apparatus, to provide counter pressure, to inflate flexible membranes, etc. This is in addition to the pressure that may be produced from a pump which can be driven by the system. These hydraulic or pneumatic tunnel and external pressure systems may allow for many other accessories to be used in conjunction to the system including, without limitation, accessories for minimal flow detectors and flexible membranes which when inflated may steer the assembly to be in line with the mass to prepare for harnessing. Some embodiments may be used to fill flexible membrane pockets which when filled could flip a funneling device to begin engagement of the mass. These pressures may be used as a signal pressure for electrical, mechanical or hydraulic switches or sensors.

Some embodiments of the present invention can be implemented in various different types of environments in which there is sufficient moving mass. For example, without limitation, some embodiments may be installed in and or on floating barges, tidal dams, barrages, rivers, behind stationary or anchored ships, behind stranded ships adrift in the ocean, attached to stationary devices in the open ocean currents, behind cooling pumps at current power generating locations, from a rotating platform in a bay, in a dam, in a tidal farm in a large open ocean current location, aqua ducts, plains and other windy land masses, in a wind farm, from a stationary platform at an airport, flagpoles, in the ducts of a forced air heating and cooling system, etc. Some embodiments may be configured to be implemented in a slow moving river or stream, which are typically more common in remote locations than fast moving rivers. An embodiment may be designed for use in a closed tidal dam scenario in which one energy harnessing system may be located inside the dammed area and another system may be located outside the dammed area. In this embodiment the tunnels may be built as part of or into the dam structure, and equipped with exhaust doors to help prevent reverse flow. When the tide rises, the inside system typically produces work, while the exhaust doors are closed on the outside tunnels, and when the tide changes, the systems would change roles.

Figure 7A:
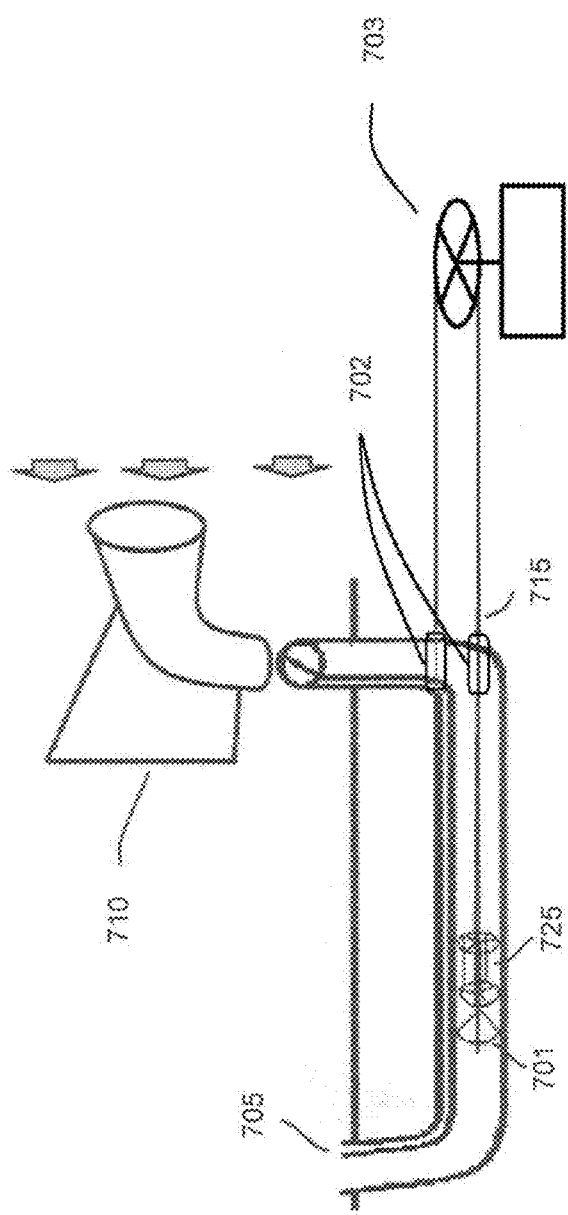
FIGS. 7A and 7B illustrate an exemplary underground application for a system for harnessing wind energy, in accordance with an embodiment of the present invention.
Figure 7B:
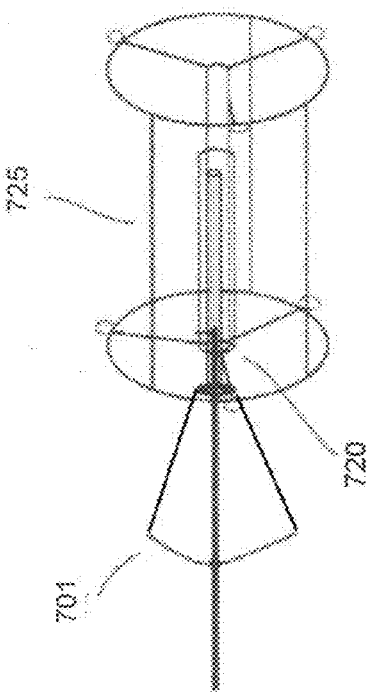

FIGS. 7A and 7B illustrate an exemplary underground application for a system for harnessing wind energy, in accordance with an embodiment of the present invention. FIG. 7A is a diagrammatic side view of the system, and FIG. 7B is a side perspective view of a wind collector 701, attached to actuator 720, mounted on a wheeled carrier 725. In the present embodiment, dual tunnels 705 may be placed below ground level, and collectors 701 may be positioned in the tunnels to traverse back and forth within the tunnels 705 as in the water version. A pulley system 703 may be located in a remote location at the end of a cable 715. A wind-steered air scoop 710 rotates to face the wind in any direction to direct the wind down through tunnels 705. Cable 715 connects to an actuator 720 for wind collector 701. The other end of cable 715 may route around the pulley 703 and to the other actuator 720 and collector 701. Actuator activators 702 for this system may be tubes protruding from the interior front wall of the tunnels 705 or on a bracket extending from the wall of the tunnels 705, or as in the other alternative embodiment the actuator activators 702 can be in the rear of the tunnels 705. Some alternative embodiments may use both front and rear actuator activators, or for multiple inline units, a tunnel may house as many activators as necessary. In a wind version, it is foreseeable that the tunnels could be located underground, for aesthetic or space saving purposes. This would require a wind collector above ground, for example without limitation, wind steered air scoop 710. This collector can be steered to face the wind either by an outside force, such as electrically or hydraulically, or by the mass itself as does a wind vane. Other accessories that may be incorporated to such an embodiment may include, without limitation, intake diverter doors to favor one tunnel at a time with more flow. Other doors may be barred doors at the exit to help prevent intrusion. For a water version, in the fixed tidal dam scenario, on the outgoing tunnels, the exit doors can be hinged to close to prevent reverse flow on the incoming tide, and vice versa on the outgoing tide collector system. The pulley system in these types of applications can be remotely located, as it is driven by the cable which is routed through the cable guides and can be mounted in the desired locations. Some alternative embodiments of the pulley system may include, but are not limited to, pulley systems which are built into structures, vessels, vehicles, gear boxes, etc. Pulley systems may be made of various components such as, but not limited to, gears, wheels, drums, reels, etc., and of various materials such as, but not limited to, plastics, metals, wood, composite materials, etc.

In the present embodiment, the actuator activators 702 can be placed in a desired location within the tunnels 705 and may be as simple as an additional fixed tube which protrudes out from the interior front end of the tunnel 705 in which the cable 715 can be routed through to cause the outer tube of an actuator 720 to engage this fixed tube to activate the actuators 720. This embodiment may potentially be used for a high speed, high pressure application. Collector 701 comprises an actuator carrier 725 that may help to create stability of collector 701 and actuator 720 as they travel within tunnel 705. Carrier 725 may be a wheeled, framed carrier or carriage as illustrated here. This carrier 725 can serve as a multi-purpose carriage. Some wind driven versions may use a wheeled carriage to help prevent dragging of the collectors on the retrieval stroke, and to help keep the collectors centered on the power stroke. Wheeled carriages can also be used in other versions to house and transport permanent magnets back and forth within the tunnels which may be designed as the stators in a dual tube linear generator. In some embodiments the carrier may comprise flexible arms of equal length that radiate outward from the actuator with low friction pads or wheels to aid in keeping the collector centered within the shaft to prevent rubbing or dragging. Similar carriages may be implemented in open air systems not in tunnels as well as fluid based systems provided there are means for the actuator activators. The carriages for these systems may be designed with low friction devices to assist in mobility such as, but not limited to, wheels, slides, rollers, low friction materials, etc. which may or may not ride in channels, or the carriages may comprise channels for shaft mounted wheels or slides, and vice versa. Such carriages may provide system stability and may help prevent the collectors from dragging or tangling with each other, and may help to align the collector to engage a rear mounted stop. Some carriages may be of a simple design such as, but not limited to, support arms protruding from the center outward to as complex as carriages configured to house permanent magnets for a tubular generator design. These carriages may be made from several materials, including but not limited to, metals, plastics, carbon fiber, wood, composite materials, fiberglass, etc.

It is contemplated that a multiplicity of suitable features may be added to some embodiments that may enhance the performance and safety of the systems. For example, without limitation, some embodiments may comprise an intake diverter device that can be actuated to direct the majority of the intake volume to one collector at a time to increase performance. This may be particularly useful in low volume situations. The diverter device can be activated with a variety of different means such as, but not limited to, hydraulic cylinders and linkages, flexible membrane pockets that may accumulate pressure to activate the device or may inflate to create a door. Some embodiments may comprise an intake funneling device similar to a large air horn or funnel. The funneling device may be self-steering and may increase the volume of mass entering the system, increase the velocity of the moving mass and may increase the efficiency of the system. In some embodiments, the funneling devices may be flexible or rigid, or both, and may be located remotely in the desired most efficient location. In some embodiments the intake of the system may comprise a deflecting device to deflect any debris in the moving mass before this debris can enter the system. Yet other embodiments may comprise controlled flow intake doors that can be used to only allow the flow of mass into the system once the mass reaches a specified pressure or speed. These doors may have various different designs including, without limitation, a horizontal door that can be directed under specified conditions to right itself to engage the flowing mass or a more controllable system such as, but not limited to, a magnetized door or a door operated by a pressure cylinder to open and engage the flowing mass under specific conditions. Other embodiments may comprise exhaust doors on the tunnels that may be used to help prevent a reverse flow situation, for example, without limitation, when the system is in a fixed installation such as, but not limited to, a tidal dam. The doors can also be used to help prevent unwanted intrusion into the system from wildlife. These exhaust doors may have various different designs including, without limitation, simple weighted or spring loaded doors, screen doors, doors actuated by hydraulic means, etc. All of these system accessories may be made to applicable size and of appropriate materials per system applications, and may or may not be electrically, hydraulically, electronically, magnetically, electromagnetically, or pneumatically assisted to improve system control and performance. Elastics and other cushioning devices may be used in various places throughout the system, for example but not limited, to absorb varying load conditions and shock and in turbulent wind or water current conditions.

Those skilled in the art will readily recognize, in light of and in accordance with the teachings of the present invention, that some embodiments may be implemented in a multiplicity of suitable configurations. For example, without limitation, some embodiments may comprise more than two tunnels. In some embodiments, depending on the application, these systems may be assembled in various multiple unit configurations. As a non-limiting example, several pairs of tunnels may be stacked side by side, or one above the other, through the use of transfer cases to drive a single generator, or to each drive their own separate generator or pump. In another non-limiting example, a container ship may be anchored in a windy bay where water currents are favorable, to incorporate a water version of this system from the stern, and a wind version from the deck of the ship, simultaneously, for a portable power generation plant. The wind version in this application may be of the tubular or linear generator type.

Some embodiments may incorporate vertical tunnels rather than horizontal tunnels. These embodiments may be configured to harness energy from masses moving in a substantially vertical direction. For example, without limitation, some embodiments may be mounted to the top of a smokestack to harness energy from rising smoke or emissions; other embodiments may harness energy from a falling mass such as, but not limited to, a waterfall. It is foreseen that some of these embodiments may require modifications to materials, design, shape, various pulley or transmission systems, collector guide tubes, modified actuator design, mountings, etc. for proper operation. Yet other embodiments may incorporate a framed collector design in applications other than energy harnessing such as, but not limited to, for sport, a braking system in race cars and other vehicles, etc.

Some embodiments may provide a clean, storable energy from wind or water. Many embodiments may have a low cost, simple design, in which many of the parts can be made from plastics, possibly recycled. It is contemplated that many embodiments will be efficient, easy to access and maintain. Additionally, some embodiments may be safer for wildlife and the environment than some current solutions. For example, without limitation, these systems may be less harmful to birds than windmills blades, and less harmful to aquatic life than turbine blades. Another benefit is that many embodiments may provide flexibility in use. For example, without limitation, many embodiments may be applied in both low and high volume/velocity scenarios. Also, some embodiments may be made portable for emergency situations such as, but not limited to, natural disasters, stranded ships, use in remote locations, etc. Some embodiments may also be installed in manmade scenarios such as, but not limited to, dams, tidal dams, tidal lagoons, tidal streams, tidal barrages, tidal farms, bridges, bays, etc. Furthermore, embodiments may be implemented to harness energy from a variety of suitable materials including, without limitation, water, wind, machinery exhaust, mud flows, lava flows, air dropping supplies, etc. It is contemplated that some embodiments may be electrically or hydraulically enhanced. Computer driven software may provide additional control or improved performance or may be used to acquire data from embodiments for research or other purposes.

Figure 8:
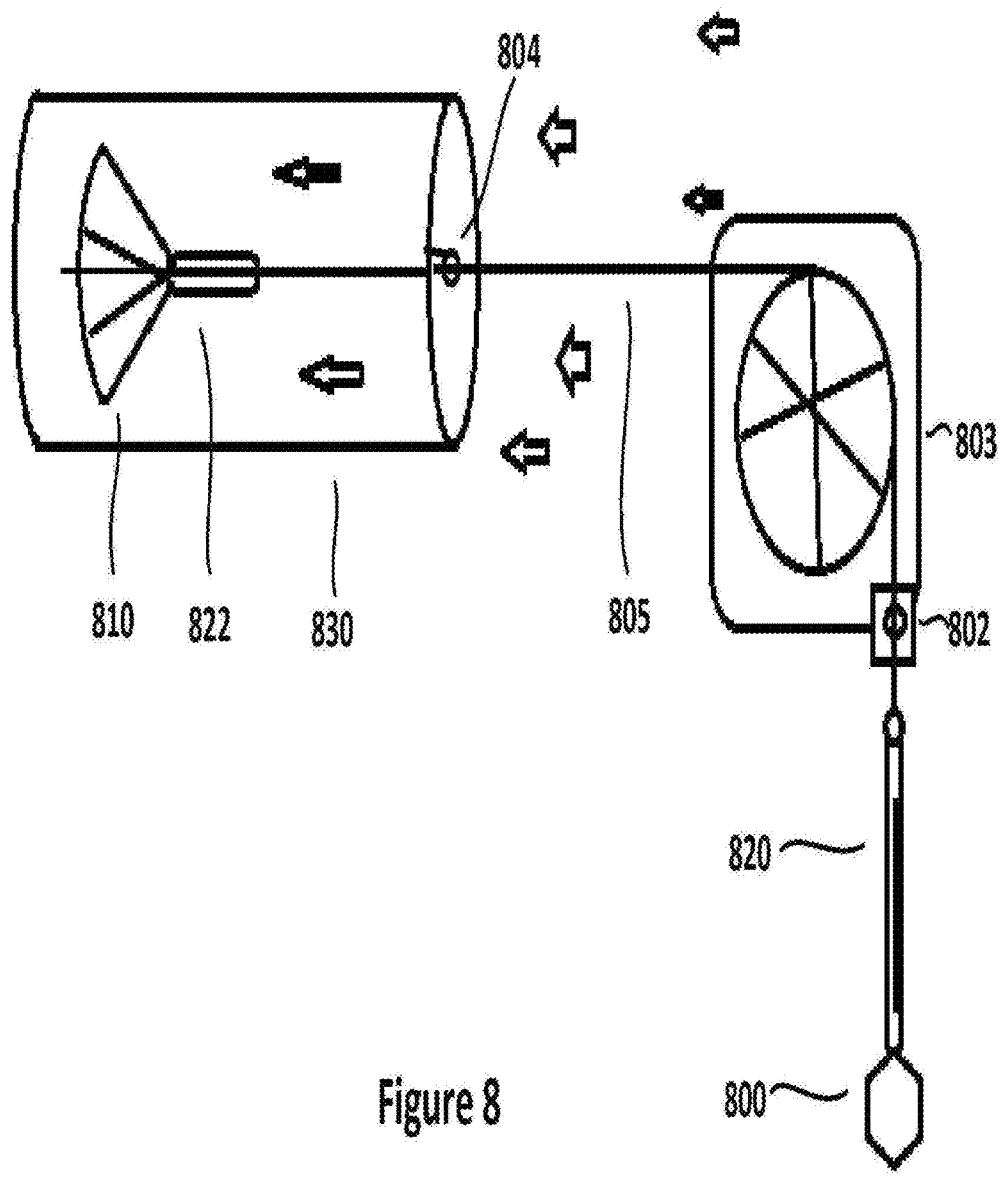
FIG. 8 is a side perspective view of an exemplary energy harnessing system, in accordance with an alternative embodiment of the present invention.

FIG. 8 is a side perspective view of an exemplary energy harnessing system using a single collector/tunnel, in accordance with an alternative embodiment of the present invention. In this alternative embodiment, one of the collector/tunnel assemblies in the dual tunnel system illustrated in FIG. 1 and/or FIGS. 6A-6B, may be replaced with alternate retrieval means such as, but not limited to, electrical, hydraulic, pneumatic, or weighted means 800 to retrieve a framed energy collector 810 (illustrated in FIGS. 4A-4C) from the end of the power stroke in a tunnel 830 (illustrated in FIGS. 5A-5C). An opposing end of a cable 805 (illustrated in FIG. 2C) may comprise a first actuator 820 (illustrated in FIGS. 2A-2B) or similar means to allow an inner cable of cable 805 to travel back and forth within an outer cable. Weight 800 or other retrieval means may enable the system to operate in a similar fashion as the dual tunnel system described above. The force that may be used to retrieve the collapsed collector 810 may include, without limitation, a spring, a hydraulic or pneumatic device, electric devices, elastic, gravity, a device having a constant drag in the moving mass, etc. and may travel with the cable 805. Cable 805 may be routed through a pulley system 803 (illustrated in FIGS. 1B-1C) to convert the linear collector motion into a rotational mechanical work force. A second actuator 822 may be retrieved with the collector 810 until actuator 822 engages a second actuator activator 804 in the intake of the tunnel 830. The weight or pressure on the outer cable will activate the first actuator 820. This may cause the collector 810 to open. The weight may be calibrated so that when the collector 810 is open, the force of the mass typically raises the weight 800 and the collector 810 may be pulled by the moving mass down the tunnel 830 until the weight 800 and the first actuator 820 on the opposite end of the cable 805 reach the second actuator activator 804 on the opposite side of the pulley system 803. As the first actuator 820 engages the first actuator activator 802, the inner cable may stop, while the outer cable continues to travel, activating both actuators 820 and 822, causing the inner tube to collapse the open collector 810 from the center. The force of gravity on the weight 800 may then overtake the force of the moving mass on the collapsed collector 810, and the collector 810 may be retrieved. In an analogy to the dual tunnel system, the weight or other forceful retrieval means takes the place of the opposing collector in the dual tunnel system. This can be achieved many ways including, without limitation, pressure from the system, hydraulic means, electronic means, pneumatic means, elastic means, etc. Weight applied to the intermediate tube of the first actuator 820, may use gravity to retrieve and open the closed collector 810 at the second actuator activator 804 located towards the intake end of the tunnel 830. An alternate activation or deactivation of the first and second actuator, 820 and 822 respectively, alternately transitions the energy collector 810 to the open and closed state. In turn, the alternate transition of the energy collector 810 to the open and closed state imparts a reciprocating motion of the energy collector 810 and the weight 800. On the other hand, activating or deactivating both the first actuator 820 and second actuator 822 at the same time places the energy collector 810 in a constant state. In additional embodiments, the single collector system may be implemented in various different configurations such as, but not limited to, a single device, in pairs, arranged in groups, stacked, side by side, or one behind the other, to suit various scenarios. The single collector system may comprise a number of components including, but not limited to, hydraulic components, pneumatic components, electronic components, magnetic components, electromagnetic components, actuators, cables, etc.

Figure 9:
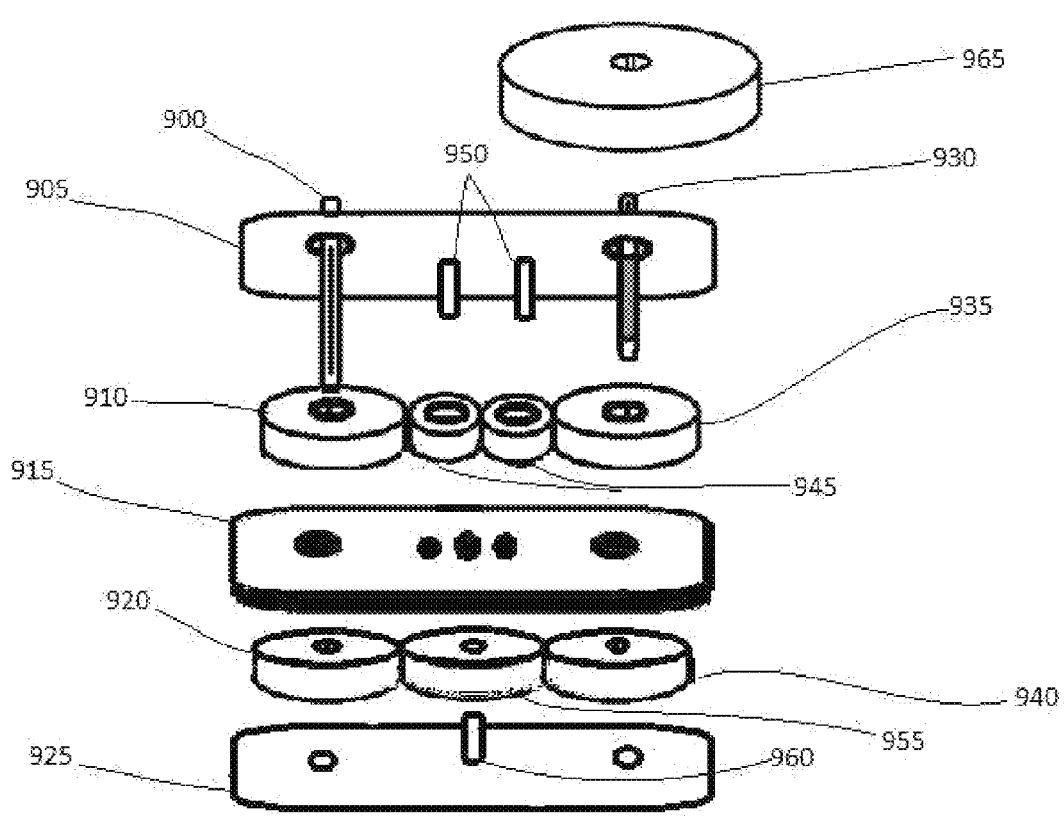
FIG. 9 is a front perspective view of an exemplary mechanical converter to convert both rotational directions into a single rotational direction, in accordance with an embodiment of the present invention.
Figure 10:
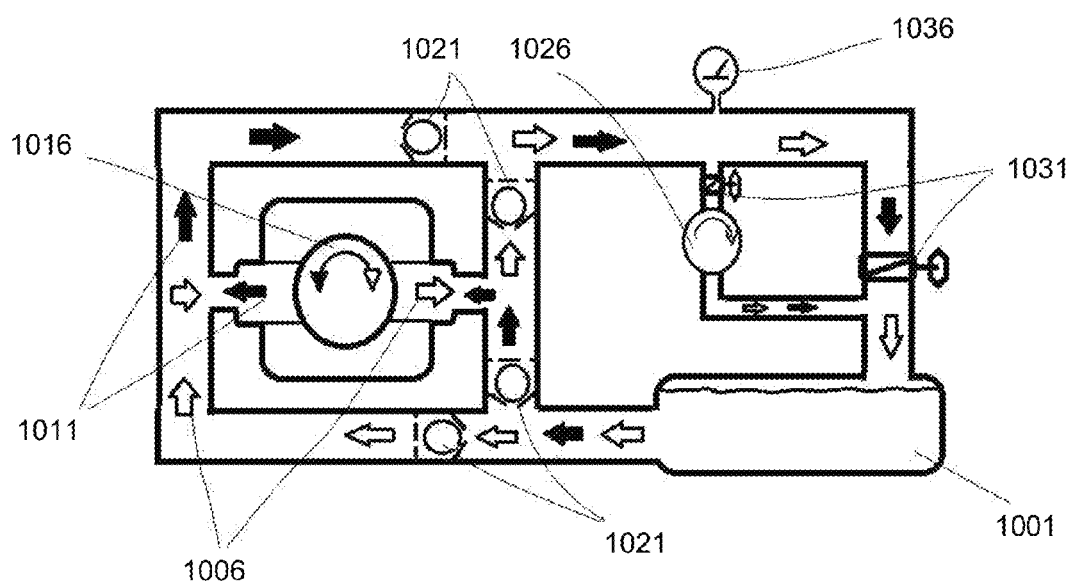
FIG. 10 is a cross sectional side view of an exemplary hydraulic system to create hydraulic pressure from both rotational directions of a bidirectional hydraulic pump, in accordance with an embodiment of the present invention.

FIGS. 9 and 10 illustrate exemplary bidirectional converter systems that may be used to convert a bidirectional drive source into a constant singular direction. FIG. 9 illustrates a mechanical system, and FIG. 10 illustrates a hydraulic system. Bidirectional converters such as these may be configured to allow for multiple system configurations and/or combinations.

FIG. 9 is a front perspective view of an exemplary mechanical converter to convert both rotational directions into a single rotational direction, in accordance with an embodiment of the present invention. In the present embodiment, a driven input shaft 900 may project through a support plate 905, a gear 910, a support plate 915, a gear 920, and a support plate 925. Input shaft 900 can be driven from either end of shaft 900. Gears 910 and 920 comprise sprag, one way, or anti reverse style bearings and may be assembled so that each gear 910 and 920 may engage input shaft 900 in opposite rotational directions. Each gear 910 and 920 may be mounted to engage an idler gear set 945 and an idler gear 955 respectively. Idler gear set 945 and idler gear 955 may comprise standard freewheeling bearings mounted on locating support pins 950 and 960. Idler gear set 945 typically causes an output gear 935 to rotate in the opposite direction of gear 910. Idler gear 955 typically causes an output gear 940 to rotate in the same direction as gear 920. Output gears 935 and 940 comprise sprag bearings and may be mounted so that each gear 935 and 940 engages an output shaft 930 in the same rotational direction. This configuration may provide additional benefits such as, but not limited to, a freewheeling output shaft 930 that disengages from output gears 935 and 940 when the driven direction is not the desired output direction. It is possible that an inertia wheel 965 may aid in the continuity of the rotation of output shaft 930 during a directional reversal of input shaft 900. All or any portions of the system may be made of various materials suitable to the implementation. The system may or may not be incased or built into a sealed waterproof housing which may also contain lubrication.

FIG. 10 is a cross sectional side view of an exemplary hydraulic system to create hydraulic pressure from both rotational directions of a bidirectional hydraulic pump, in accordance with an embodiment of the present invention. In the present embodiment, the hydraulic system comprises a reservoir 1001, a pump 1016, and check valves 1021. Ball style check valves are drawn in for clarity, although it is contemplated that various different types of check valves may be used such as but not limited to swing valves, flapper valves, spring loaded valves, pressure loaded valves, or gravity favored check valves. The ball style check valves 1021 function so that when the ball is pushed by the fluid towards the check valve seat, the valve 1021 typically blocks fluid flow. When pushed away from the check valve seat, the valve 1021 typically allows fluid flow. Arrows 1006 and 1011 indicate fluid flow in direct correspondence to the rotation of pump 1016. Hollow arrows 1006 indicate flow when pump 1016 is rotated in the clockwise direction, and solid black arrows 1011 indicate fluid flow when pump 1016 rotates in the counter clockwise direction. This configuration may create flow and pressure to a gauge 1036 from both rotational directions of pump 1016. With the use of valves 1031, pressure and volume can be controlled to power a hydraulic motor 1026 in one direction.

Figure 11:
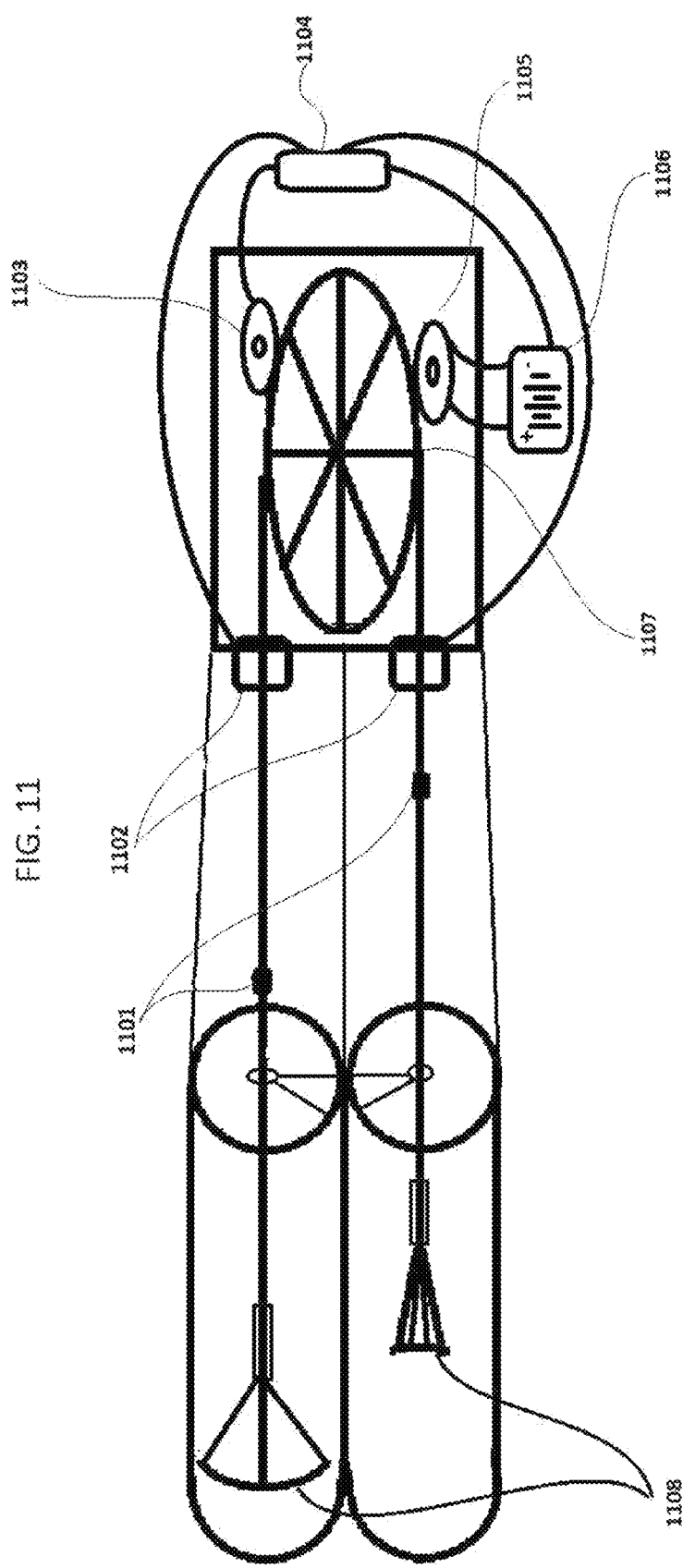
FIG. 11 is a top view of an exemplary energy harnessing system to drive an electrical generator to charge a battery.

It is conceivable that various control systems can enable optional, additional or complementary features of these systems, in combination with the systems and devices previously discussed. FIG. 11 is a top view of an exemplary energy harnessing system to drive an electrical generator 1105 to charge a battery 1106. In some embodiments, the actuating cycle of the system can be accomplished by quickly turning or advancing pulley 1107 in its current direction of travel. The amount of driven rotation translates to the inches of required actuator travel per the particular system. In the current embodiment, the actuator/cable travel of approximately 21", equates to approximately $\frac{1}{3}^{rd}$ turn of pulley 1107. In one embodiment, this action can be accomplished with the use of a standard (PLC) Programmable Logic Control 1104 and bidirectional drive motor 1103. Controller 1104, powered by battery 1106, can be programmed to use sensors 1102, and triggers 1101 to sense the positions of collectors 1108, and switch the motor 1103 into the corresponding drive mode, driving pulley 1107 in the desired direction, at a controlled speed, and duration, faster than the current (RPMs) revolutions per minute. This will cause the pulley 1107 to advance the outer cable position in reference to the inner cable position which is held in linear place via the weight in the open collector. This action causes the expanded collector 1108 to collapse, emptying the water, and also triggering the opposing, collapsed collector to begin to open, re-engaging the passing mass. This action has been experienced by hand while testing present embodiment and it is conceivable that this action on the pulley can be accomplished electrically, electronically, electromagnetically, hydraulically, mechanically, or with any combination thereof. In other embodiments, it is conceivable that the drive motor 1103 can be configured to generate electricity when in regeneration mode, controlled by the controller. It is also possible that these types of systems may or may not require the perpendicular pin, slot in the intermediate tubes, nor the outer tubes required systems using actuator activators, however, the outer tubes present the opportunity for fine tuning, or for reliability or performance purposes. It is also conceivable that high-performance systems can be made with the intermediate tubes and spreaders mounted directly to or molded as part of the outer cable.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method, the steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing means for harnessing energy from naturally and manmade moving masses according to the present invention will be apparent to those skilled in the art. Various aspects of the invention have been described above by way of illustration, and the specific embodiments disclosed are not intended to limit the invention to the particular forms disclosed. The particular implementation of the means for harnessing energy may vary depending upon the particular context or application. By way of example, and not limitation, the means for harnessing energy described in the foregoing were principally directed to fluid or gas driven implementations; however, similar techniques may instead be applied to harness energy from moving masses of particulate solids such as, but not limited to, sand sliding down a hill, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a tunnel implement, said tunnel implement is configured for immersion in a moving mass, wherein at least an energy from at least a part of the moving mass passing through said tunnel implement is operable for conversion to a rotational force;
    a collector device disposed in said tunnel implement, said collector device is configured to transition from an open state to a collapsed state in activation of an actuator wherein said collector device in said open state is configured to resist the moving mass;
    a controller device, wherein said controller device is configured to operate said collector device in said open state and said collapsed state;
    a sensor device, in which said collector device comprises at least a pair of collector implements, wherein said sensor device is configured to sense a position of each of said collector implements;
    a trigger device, wherein said trigger device is configured to activate said sensor device to provide location information of individual collector implements to said controller device;
    a cable device, wherein said cable device is operable for at least transferring reciprocating motion of said collector device and transmitting said collector implement transitioning;
    a pulley device, wherein said pulley device is configured to impart a direction of travel to said cable device, and wherein said controller device is operable to control said pulley device to cause said collector implement transitioning via said cable device; and
    a bidirectional drive motor device operable for imparting a drive mode to said pulley device, wherein said bidirectional drive motor device is configured to drive said pulley device in a predetermined direction at a controlled speed and duration.

2. The system as recited in claim 1, further comprising two gears engaged and driven by an input shaft, wherein said two gears comprises at least one of a sprag, a one way, and an anti-reverse style bearings.

3. The system as recited in claim 2, further comprising idler gears attached to said two gears, wherein said idler gears comprise standard freewheeling bearings.

4. The system as recited in claim 3, further comprising output gears attached to said idler gears, wherein said output gears comprise sprag bearings.

5. The system as recited in claim 4, further comprising an inertia wheel, wherein said inertia wheel aids in a continuity of rotation of an output shaft during directional reversal of the input shaft.

6. The system as recited in claim 1, further comprising a hydraulic system having a check valve, wherein said check valve comprise at least, one of ball style check valve, swing valve, flapper valve, spring-loaded valve, pressure-loaded valve, and gravity favored check valve.

7. The system as recited in claim 1, wherein flow and pressure is created to a gauge from both rotational directions of said pulley device.

8. The system as recited in claim 1, wherein the tunnel implement is one of built into and part of a structure comprising one of a tidal dam and a barge hull.

9. The system as recited in claim 1, in which said sensor device is positioned in a location to sense position of the triggering device associated with said collector implement position.

10. The system as recited in claim 9, in which said sensor device is configured to signal said controller to activate said collector transitioning.

11. The system as recited in claim 10, in which said cable device is operable for transmitting said transitioning motion from said pulley device.

12. The system as recited in claim 1, further comprising a carriage assembly for guiding said collector device.

13. The system as recited in claim 1, further comprising a spreader assembly for joining said collector device to said actuator.

14. A system consisting essentially of:
   a tunnel implement, said tunnel implement is configured for immersion in a moving mass, wherein at least an energy from at least a part of the moving mass passing through said tunnel implement is operable for conversion to a rotational force;
   a collector device disposed in said tunnel implement, said collector device having at least an open state and a collapsed state, wherein said collector device in said open state is configured to resist the moving mass;
   a controller device, wherein said controller device is configured to operate said collector device in said open state and said collapsed state;
   a sensor device, wherein said sensor device is configured to sense a position of said collector device;
   a trigger device, wherein said trigger device is configured to trigger said sensor device to inform said controller device of said collector device in said open state and said collapsed state;
   a cable device, wherein said cable device is operable for at least transferring reciprocating motion of said collector device and operable for transferring a system activation to said collector device;
   a pulley device, wherein said pulley device is configured to impart a direction of travel to said cable device;
   a bidirectional drive motor device operable for imparting a drive mode to said pulley device, wherein said bidirectional drive motor device is configured to drive said pulley device in a predetermined direction at a controlled speed and duration;
   a cable guide device joined to said tunnel implement that is operable for guiding said cable;
   a rotatable device that is configured to align an intake of said tunnel implement to said moving mass; and
   wherein the moving mass comprises at least one of water and air.

15. The system as recited in claim 14, further comprising a collar joined to said tunnel implement for joining said cable guide device.

16. A system comprising:
   a tunnel implement, said tunnel implement is operable for immersion in a moving mass, wherein at least an energy from at least a part of the moving mass passing through said tunnel implement is operable for conversion to a rotational force;
   a collector device disposed in said tunnel implement, in which said collector device comprises at least a pair of collector implements, said collector device having at least an open state and a collapsed state, wherein said collector device in said open state is configured to resist the moving mass;
   a controller device, wherein said controller device is configured to operate said collector device in said open state and said collapsed state, operable for providing a reciprocating motion of said collector implements;
   a sensor device, wherein said sensor device is configured to sense a position of each of said collector implements and translate this information to said controller device;
   a trigger device, wherein said trigger device is configured to activate said sensor device;
   a cable device, wherein said cable device is operable for at least transferring said reciprocating motion of said collector devices and operable for transferring a system activation to said collector device;
   a pulley device, wherein said pulley device is configured to impart a direction of travel to said cable device;
   a bidirectional drive motor device operable for imparting a drive mode to said pulley device, wherein said bidirectional drive motor device is configured to drive said pulley device in a predetermined direction at a controlled speed and duration;
   a cable guide device joined to said tunnel implement that is operable for guiding said cable device;
   a rotatable device that is configured to align an intake of said tunnel implement to engage said moving mass; and
   wherein the moving mass comprises at least one of water and air.

* * * * *